US010569972B2

(12) United States Patent
Montag et al.

(10) Patent No.: US 10,569,972 B2
(45) Date of Patent: Feb. 25, 2020

(54) METERING SYSTEM FOR SOLID PARTICULATE

(71) Applicant: Montag Investments, LLC, Emmetsburg, IA (US)

(72) Inventors: Roger A. Montag, Malcolm, NE (US); Isaac Mogler, West Bend, IA (US); Jason Fehr, Ottosen, IA (US)

(73) Assignee: MONTAG INVESTMENTS, LLC, Emmetsburg, IA (US)

( * ) Notice: Subject to any disclaimer, the term of this patent is extended or adjusted under 35 U.S.C. 154(b) by 924 days.

(21) Appl. No.: 14/600,657

(22) Filed: Jan. 20, 2015

(65) Prior Publication Data

US 2016/0207018 A1 Jul. 21, 2016

(51) Int. Cl.

*B65G 53/66* (2006.01)
*B65G 53/48* (2006.01)
*A01C 7/06* (2006.01)
*A01C 19/02* (2006.01)
*A01C 21/00* (2006.01)

(Continued)

(52) U.S. Cl.

CPC ................ *B65G 53/66* (2013.01); *A01C 7/06* (2013.01); *A01C 19/02* (2013.01); *A01C 21/005* (2013.01); *B65G 53/48* (2013.01); *C05G 3/0094* (2013.01); *G01F 13/005* (2013.01); *A01C 7/082* (2013.01); *A01C 7/16* (2013.01)

(58) Field of Classification Search

CPC ........... A01C 7/082; A01C 7/084; A01C 7/16; A01C 15/04; A01C 15/06; A01C 15/006; A01C 19/02; A01C 21/005; B01F 15/0216; B01F 3/06; B01F 3/18; B65G 53/16; B65G 53/528; B65G 53/66; B65G 53/48; B65G 69/00; C05G 3/0094; G01F 13/005

See application file for complete search history.

(56) References Cited

U.S. PATENT DOCUMENTS 318,377 A 5/1885 Latcha
557,058 A 3/1896 Dodge (Continued)

FOREIGN PATENT DOCUMENTS

CN 101828099 A 9/2010
CN 202497837 U 10/2012

(Continued)

OTHER PUBLICATIONS

"International Application No. PCT/US2015/012021 International Search Report and Written Opinion", dated May 5, 2015, 18 pages.

(Continued)

*Primary Examiner* — David C Mellon
(74) *Attorney, Agent, or Firm* — Goodhue, Coleman & Owens, P.C.

(57) ABSTRACT

An improved particulate handling system is provided. The system includes a plurality of particulate storage areas and a plurality of types of particulate. Each type of particulate can be housed in a separate particulate storage area. Separate particulate conveyors are in operable communication with each of the particulate storage areas. Separate drive systems can be in operable control of the each of the particulate conveyors. The particulate conveyors convey particulate into an air flow path. The separate drive systems can be operated independently and/or at varied speeds.

19 Claims, 24 Drawing Sheets

(51) Int. Cl.

| | |
|---|---|
| ***C05G 3/00*** | (2006.01) |
| ***G01F 13/00*** | (2006.01) |
| ***A01C 7/16*** | (2006.01) |
| ***A01C 7/08*** | (2006.01) |

(56) References Cited

U.S. PATENT DOCUMENTS

| | | | | |
|---|---|---|---|---|
| 771,118 | A | | 9/1904 | Bechtel et al. |
| 1,630,317 | A | | 5/1927 | Skonier |
| 1,786,969 | A | | 12/1930 | Van Der Heuel |
| 1,805,940 | A | | 5/1931 | Dolan |
| 1,992,090 | A | | 2/1935 | Pestalozza |
| 2,395,973 | A | | 3/1946 | Mcintosh |
| 2,452,898 | A | | 11/1948 | Bourdette |
| 2,793,914 | A | | 5/1957 | Gardeniers et al. |
| 2,865,260 | A | | 12/1958 | Lee |
| 2,959,869 | A | | 11/1960 | Ackerman |
| 3,314,734 | A | | 4/1967 | Lewis |
| 3,373,973 | A | | 3/1968 | Schmidt Holthausen |
| 3,386,773 | A | | 6/1968 | Ballard, Jr. |
| 3,568,937 | A | | 3/1971 | Grataloup |
| 3,596,805 | A | | 8/1971 | Farmery |
| 3,606,097 | A | | 9/1971 | Wall |
| 3,625,431 | A | | 12/1971 | Andersson |
| 3,708,208 | A | | 1/1973 | Fuss |
| 3,710,983 | A | | 1/1973 | Ricciardi |
| 3,893,515 | A | | 7/1975 | Sadler |
| 3,894,721 | A | | 7/1975 | Boenisch |
| 3,926,377 | A | | 12/1975 | Johnson |
| 4,008,855 | A | | 2/1977 | van der Lely |
| 4,020,991 | A | | 5/1977 | Dreyer |
| 4,087,079 | A | | 5/1978 | Kramer |
| 4,142,685 | A | | 3/1979 | Dreyer et al. |
| 4,402,635 | A | | 9/1983 | Maruo |
| 4,413,934 | A | | 11/1983 | Kern |
| 4,422,810 | A | | 12/1983 | Boring |
| 4,432,675 | A | | 2/1984 | Machnee |
| 4,473,016 | A | | 9/1984 | Gust |
| 4,479,743 | A | | 10/1984 | Stahl |
| 4,495,968 | A | | 1/1985 | Kist |
| 4,529,104 | A | | 7/1985 | Tyler |
| 4,561,781 | A | | 12/1985 | Seymour |
| 4,562,968 | A | | 1/1986 | Widmer et al. |
| 4,569,486 | A | | 2/1986 | Balmer |
| 4,583,883 | A | | 4/1986 | Johanning |
| 4,793,744 | A | | 12/1988 | Montag |
| 4,801,210 | A | * | 1/1989 | Gian ....................... B01F 13/10 366/10 |
| 4,834,004 | A | | 5/1989 | Butuk et al. |
| 4,900,157 | A | | 2/1990 | Stegemoeller et al. |
| 5,018,869 | A | | 5/1991 | Paul |
| 5,104,229 | A | | 4/1992 | Paul |
| 5,299,888 | A | | 4/1994 | Wysong et al. |
| 5,592,889 | A | | 1/1997 | Bourgault |
| 5,775,585 | A | | 7/1998 | Duello |
| 5,913,602 | A | * | 6/1999 | Steele ................. B01F 15/0483 366/132 |
| 5,934,205 | A | | 8/1999 | Gordon |
| 6,142,714 | A | | 11/2000 | Montag |
| 6,305,835 | B1 | | 10/2001 | Farrar et al. |
| 6,357,905 | B1 | * | 3/2002 | Birchard ................. B01F 5/221 366/178.1 |
| 7,344,298 | B2 | | 3/2008 | Wilmer et al. |
| 7,854,066 | B2 | | 12/2010 | Wendte |
| 8,336,469 | B2 | | 12/2012 | Preheim et al. |
| 8,616,761 | B2 | | 12/2013 | McLaughlin et al. |
| 9,681,602 | B2 | | 6/2017 | Montag et al. |
| 9,781,878 | B2 | | 10/2017 | Montag |
| 2003/0161694 | A1 | | 8/2003 | Bauver et al. |
| 2005/0024988 | A1 | | 2/2005 | Hoff et al. |
| 2012/0186501 | A1 | | 7/2012 | Zarnescu et al. |
| 2012/0230778 | A1 | | 9/2012 | Petit et al. |
| 2016/0207015 | A1 | | 7/2016 | Montag et al. |
| 2016/0207016 | A1 | | 7/2016 | Montag et al. |
| 2016/0207018 | A1 | | 7/2016 | Montag et al. |
| 2016/0207718 | A1 | | 7/2016 | Montag et al. |

FOREIGN PATENT DOCUMENTS

| | | | |
|---|---|---|---|
| CN | 104923097 | A | 9/2015 |
| CN | 103349930 | B | 1/2016 |

OTHER PUBLICATIONS

"International Application No. PCT/US2015/012050 International Search Report and Written Opinion", dated May 5, 2015, 17 pages.

* cited by examiner

METERING SYSTEM FOR SOLID PARTICULATE

BACKGROUND

I. Field of the Disclosure

A metering system for solid particulate is disclosed. More specifically, but not exclusively, a particulate handling system with variable blend and variable application rate controls for particulate matter, such as dry fertilizers, is disclosed.

II. Description of the Prior Art

Particulate metering systems use varied approaches to control the rate at which particulate is metered and/or blended with other particulate types. Particulate metering is complicated by the desire to simultaneously meter at separate discharge points varying rates and blends of different particulate. In such instances where the particulate is fertilizer, there's a significant interest in controlling the blend and application rate of two or more fertilizers, and specifically controlling a variation in the blend and application rate of two or more fertilizers at separate discharge points, such as at separate rows in a field. Further complications surround the growing desire to independently control variations in both the blend and application rate of particulate for each separate discharge point or for a set of discharge points. Many desire to independently control the blend and application rate of two or more fertilizers. In other words, what is desired in at least one application is a dry fertilizer metering system that can make adjustments to both the application rate and blend of two or more fertilizers on a row-by-row basis—one row receiving a blend of fertilizers at a desired rate while another row simultaneously receives the same or a separate blend of fertilizers at the same or another desired rate.

SUMMARY

The present disclosure provides a particulate handling system for a particulate metering system with variable blend and variable application rate controls. The particulate handling system can include a plurality of particulate storage areas and a plurality of types of particulate. One of the types of particulate can be housed in one of the plurality of particulate storage areas. A first set of particulate conveyors is in operable communication with one of the plurality of particulate storage areas. A second set of particulate conveyors is in operable communication with a separate one of the particulate storage areas. A first drive system is in operable control of the first set of particulate conveyors and a second drive system is in operable control of the second set of particulate conveyors. The first set of particulate conveyors can convey a type of particulate into an air flow path and the second set of particulate conveyors can convey a separate type of particulate into the air flow path. The first drive system and the second drive system can be operated independently and/or at varied speeds.

The particulate handling system can include a particulate mixing chamber in communication with a particulate conveyor from the first set of particulate conveyors and a particulate conveyor from the second set of particulate conveyors. The particulate mixing chamber receives at least one type of particulate. The particulate mixing chamber can also include at least one directional bend in the air flow path.

One or more metering controls can be in operable control with the first set of particulate conveyors and the second set of particulate conveyors. The metering controls can obtain data from each of the particulate storage areas.

According to another aspect of the disclosure, a particulate flow path is provided. The particulate flow path can include a plurality of particulate storage areas and a plurality of particulate accelerators in fluid communication with an air source. Each of the particulate accelerators has an air-particulate output. The particulate flow path can also include a mixing area within each of the particulate accelerators and a discharge line connected to the air-particulate output of each of the particulate accelerators. A plurality of operated conveyances is also provided. One of the operated conveyances is in operable communication with one of the particulate storage areas. The operated conveyances convey particulate from the particulate storage areas to each of the particulate accelerators. Thereafter, the particulate descends vertically within the particulate accelerators into the mixing area. Within the mixing area, the particulate can mix with and be suspended by air from the air source. Thereafter, the air-particulate mixture moves through the air-particulate output into the discharge line.

Two of the operated conveyances can be coupled to opposing walls of each of the particulate accelerators. One or more drive systems can be in operable control of the operated conveyances.

According to yet another aspect of the disclosure, a method for handling particulate in a particulate metering system is provided. The method includes providing a plurality of containers. Each of the containers stores a particulate. The particulate is dispensed through one or more gates disposed on a bottom portion of each of the particulate containers into a plurality of cartridges. The particulate is conveyed within the cartridges and into particulate accelerators. An air flow is provided through the plurality of accelerators, which accelerates the particulate. The air flow and the particulate mix and the mixture are outputted.

The particulate can be suspended in the air flow. The air flow provided to the plurality of accelerators can have a common air source. Each of the cartridges can be independently controlled.

BRIEF DESCRIPTION OF THE DRAWINGS

Illustrated embodiments of the disclosure are described in detail below with reference to the attached drawing figures, which are incorporated by reference herein, and where.

DETAILED DESCRIPTION

Figure 1:
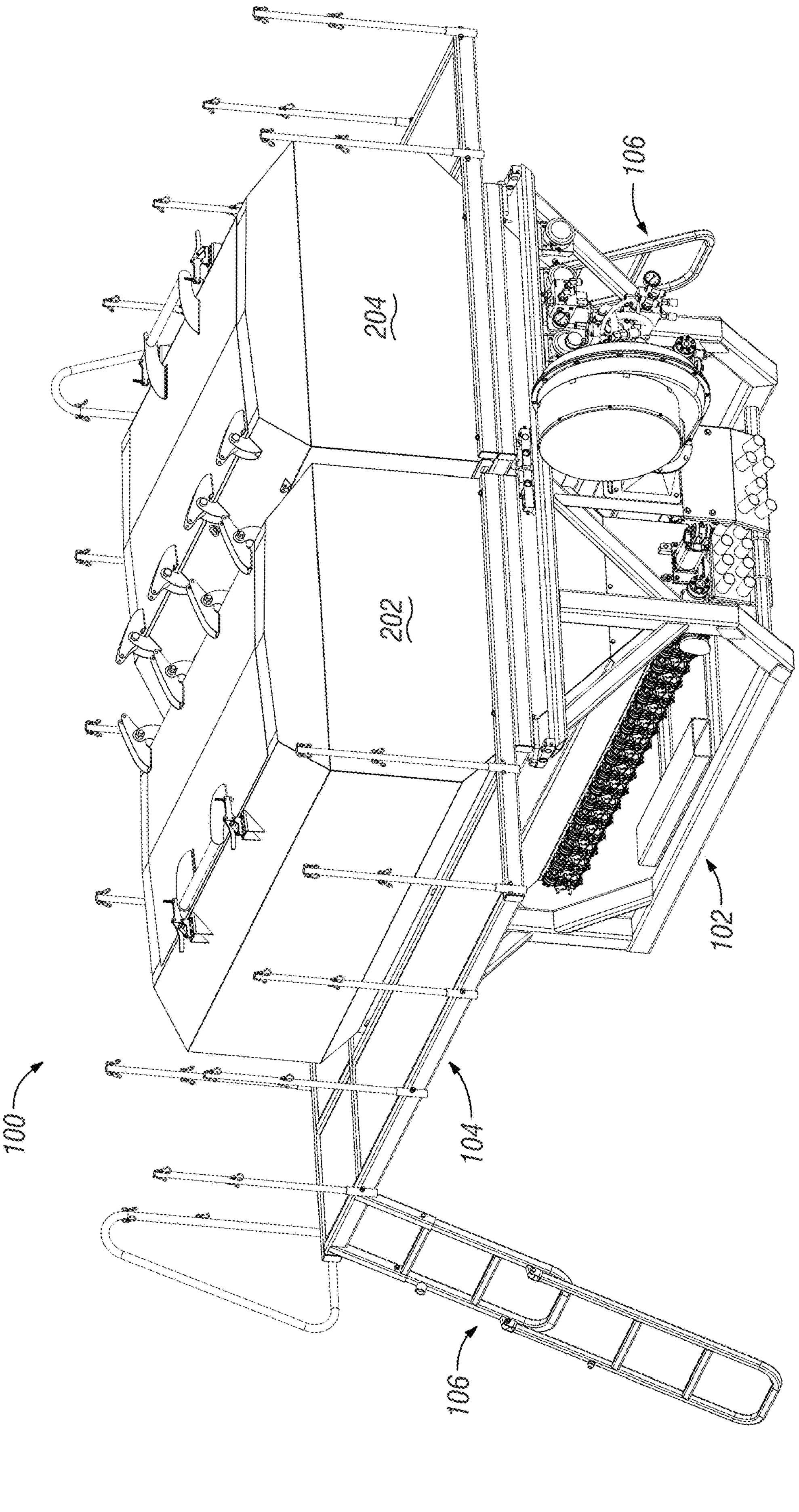
FIG. 1 is a front perspective view of a particulate metering implement in accordance with an illustrative embodiment.

FIG. 1 shows a particulate metering implement 100. While the figure shows a particulate metering implement, it should be appreciated by those skilled in the art that the disclosure covers other types of implements, including but not limited to, seed meters, seed planters, nutrient applicators, and other agricultural equipment. The implement 100 can be mounted upon a towable trailer or other suitable structure such as a toolbar, or integrally formed with a particulate application system. The implement can include a frame assembly 102, upon which particulate containers 202 and 204 can be mounted. For user accessibility to the particulate containers 202 and 204, a platform 104 and ladders 106 can be provided.

Figure 2:
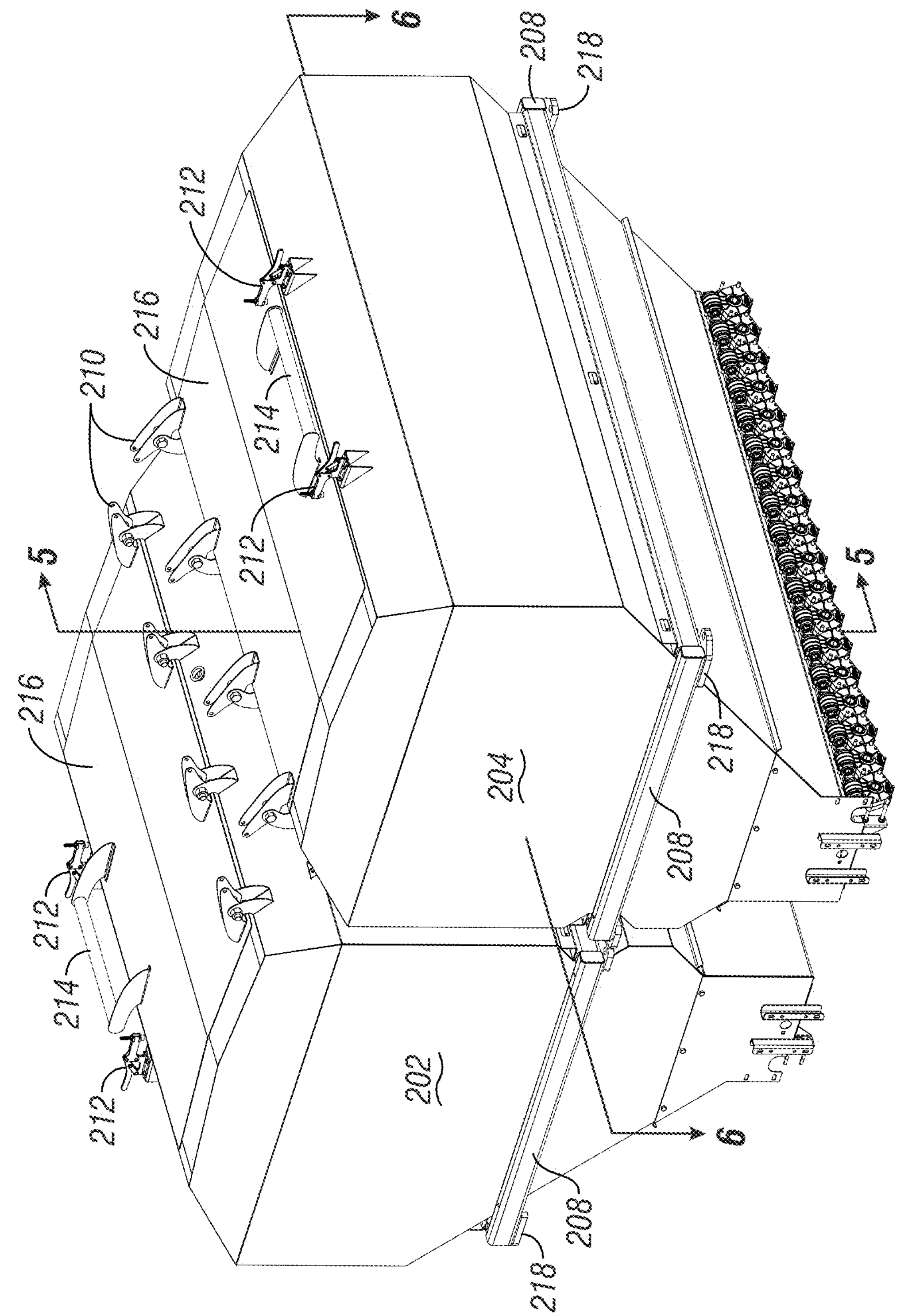
FIG. 2 is a front perspective view of a particulate container system in accordance with an illustrative embodiment.
Figure 3:
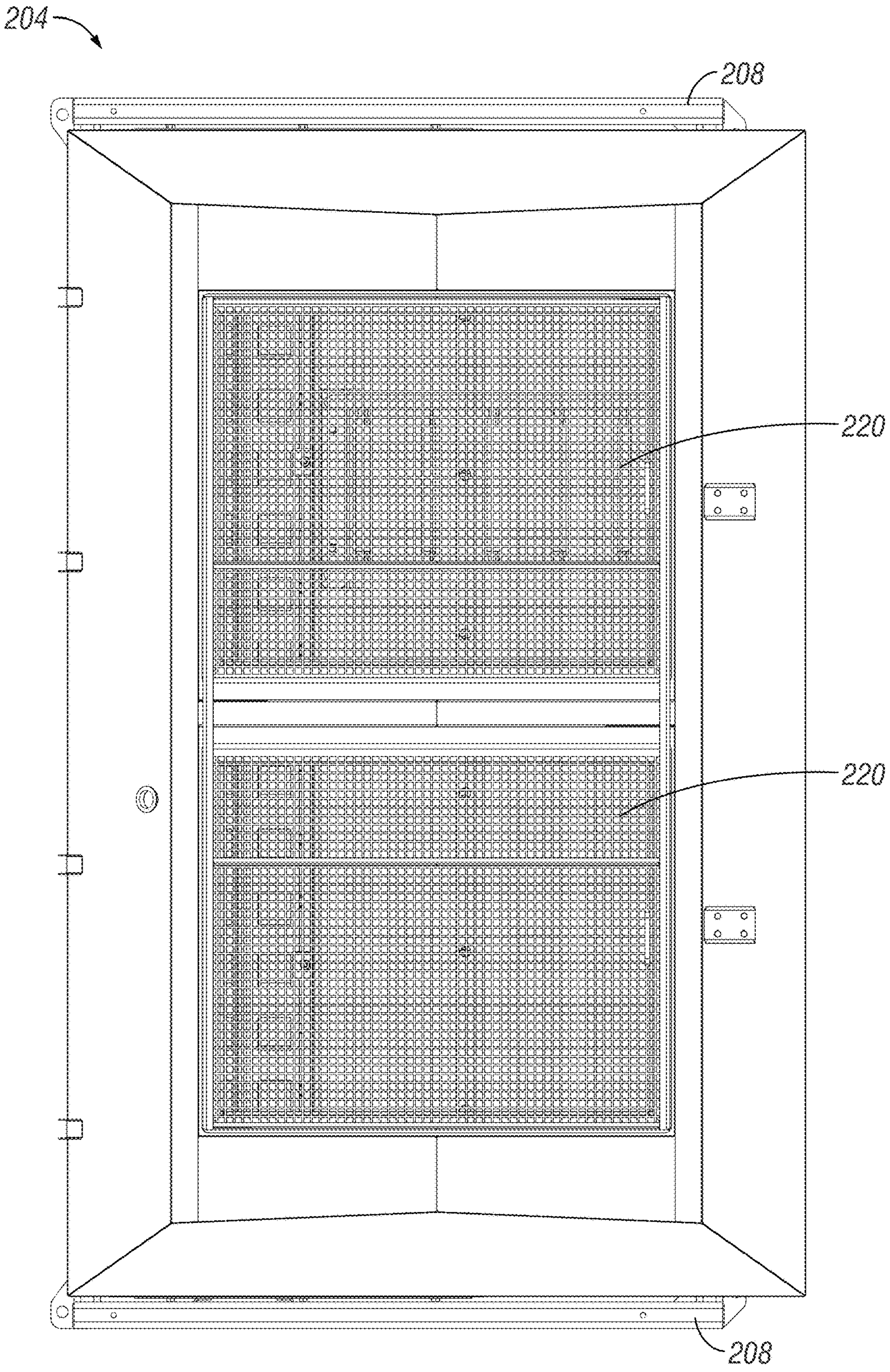
FIG. 3 is a top plan view of a particulate container in accordance with an illustrative embodiment.

Referring to FIG. 2, the particulate containers 202 and 204 can be connected to the frame assembly 102 by frame members 208 having attachment means 218. A top surface of the particulate containers 202 and 204 can include openings (not shown) covered by one or more lids 216. The lids 216 can be opened or removed to permit loading of particulate into and/or servicing the particulate containers 202 and 204. In an exemplary embodiment, an edge of the lids 216 can be pivotally connected to the particulate containers 202 and 204 with one or more hinges 210. One or more clamps 212 can be mounted on the particulate containers 202 and 204 proximate to the opposing edge of the lids 216 to releasably secure the lids to the containers. To assist in opening the lids 216, a handle 214 can be connected to the lids 216 proximate the clamps 212. Upon opening and/or removal of the lids 216, one or more screens 220 can be disposed within the openings of the particulate containers 202 and 204, as shown illustratively in FIG. 3, to prevent debris from entering the same.

Further, the clamps 212 can provide an airtight seal between the lids 216 and the particulate containers 202 and 204. In such an embodiment, the airtight seal can permit the particulate containers 202 and 204 to be pressurized. In one representative example, the particulate containers 202 and 204 can be pressurized to ten, fifteen, twenty or greater inches of water (in $H_2O$). The pressurization can assist in guiding the particulate to the particulate handling system 300, provide for improved control of quantities dispensed to the particulate handling system 300, and/or provide for improved control of the environment in which the particulate is housed.

In an embodiment, the particulate containers 202 and 204 can be symmetrical in structure and identical in function. In other embodiments, the one or more of the particulate containers can be modified without deviating from the objects of the disclosure. Hereinafter, discussion of particulate container 204 refers to particulate container 204 and its counterpart structure particulate container 202.

Figure 4:
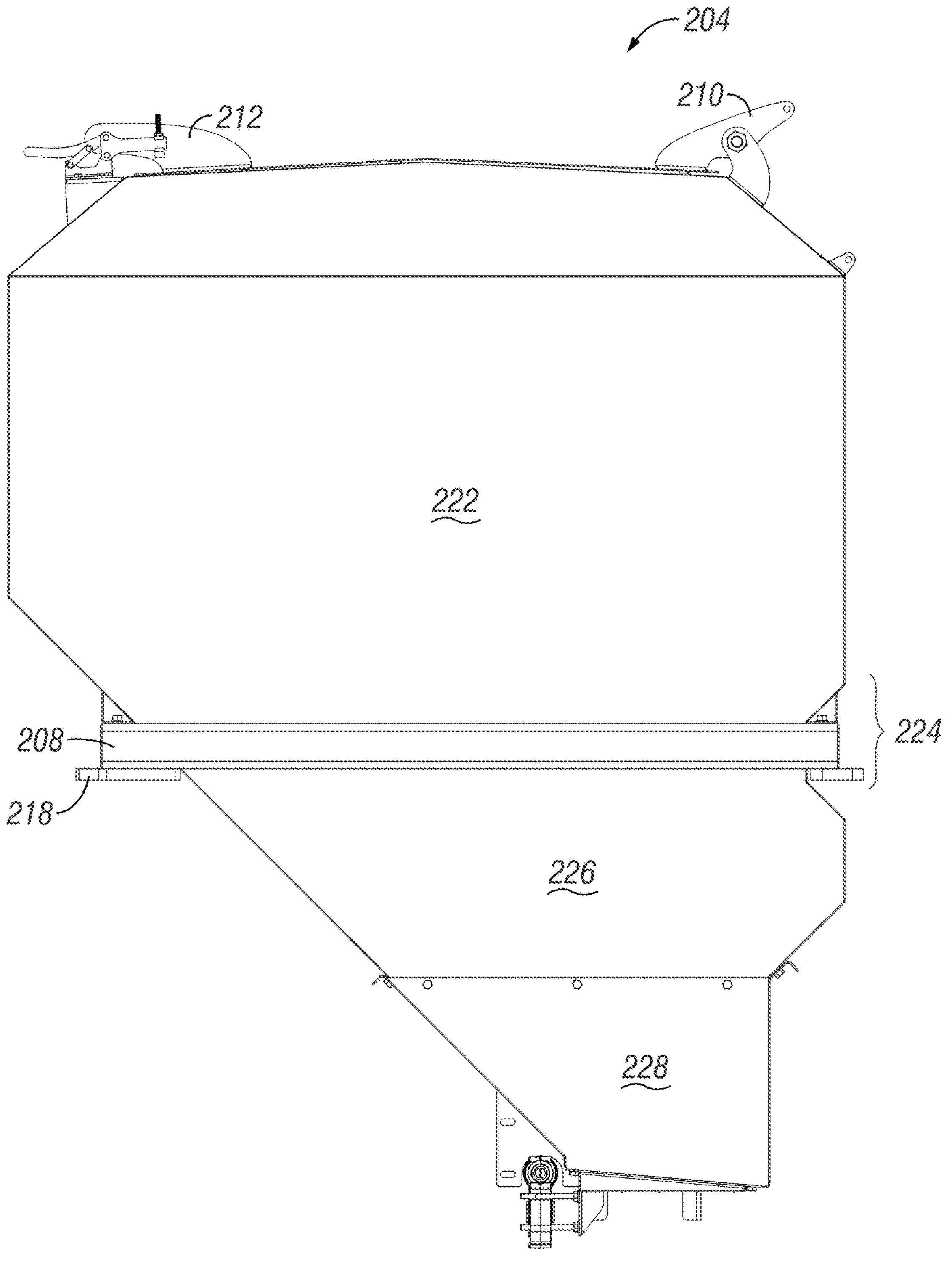
FIG. 4 is a side elevation view a particulate container in accordance with an illustrative embodiment.
Figure 5:
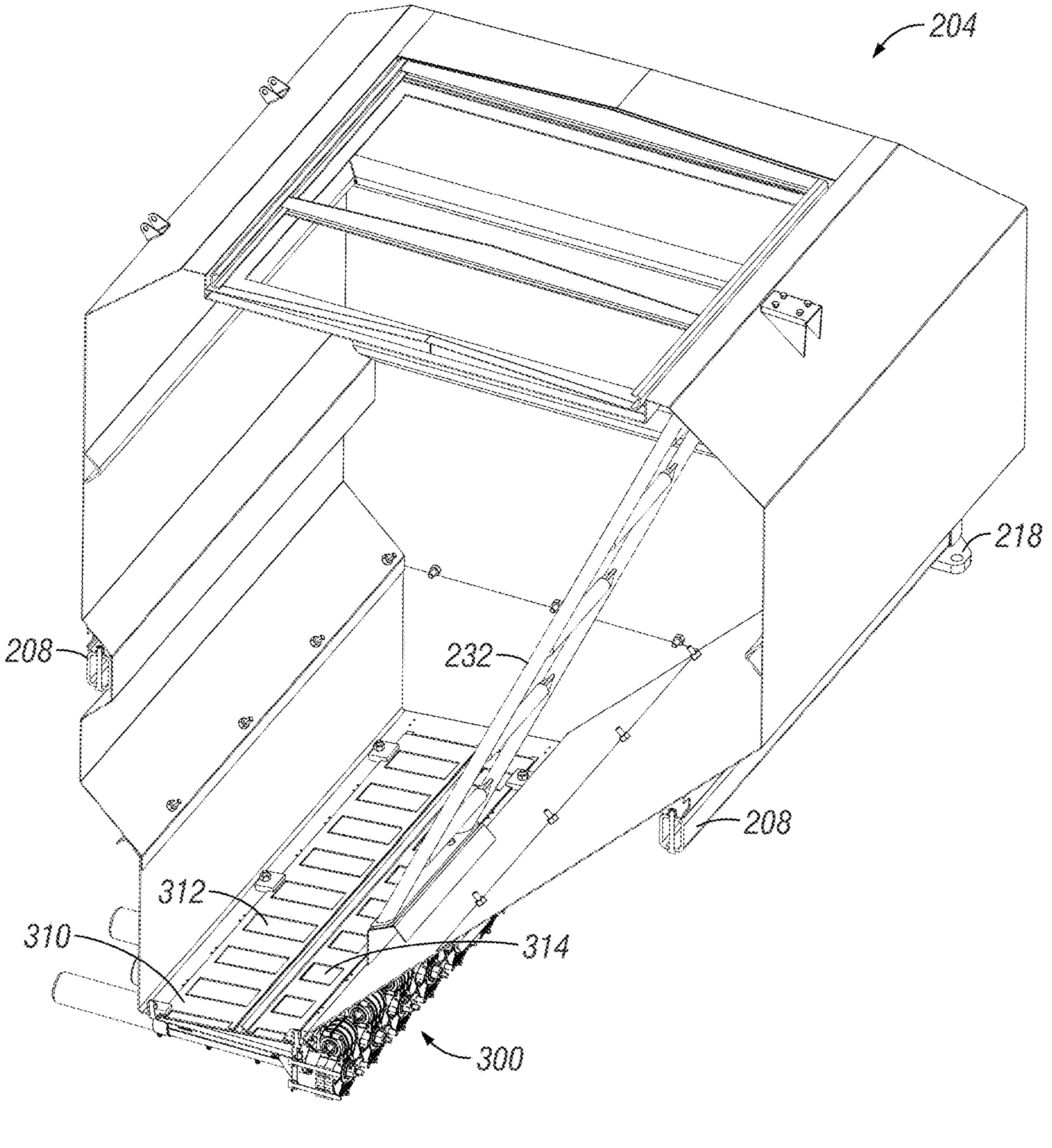
FIG. 5 is a cross-sectional view of the particulate container of FIG. 2 taken along section line 5-5.

Referring to FIGS. 4 and 5, particulate container 204 can include an upper portion 222, a middle portion 226, and a lower portion 228. The upper portion 222 can be a rectangular prism or like shapes to maximize storage capacity above the frame assembly 102 (FIG. 1). The middle portion 226 can be a trapezium prism or like shapes to assist in funneling the particulate to the lower portion 228. The transition from the upper portion 222 to the middle portion 226 can be generally demarcated by frame members 208 disposed around the perimeter of the middle portion 226 of the particulate container 204. The particulate container 204 can also have a recessed area 224 on the side wall proximate to opposing particulate container 202. The recessed area 224 prevents frame member 208 from extending past the plane of the side wall, which maximizes the volume of the particulate container 204 while also minimizing the space required between the two particulate containers 202 and 204. The lower portion 228 can also be a trapezium prism or like shapes to assist in funneling the particulate to the base of the particulate container 204. Further, to assist in servicing the inside of the particulate container 204, a ladder 232 can be provided.

In addition to the shape of the particulate container 204, other means can be provided within or on the container to assist in funneling the particulate to the base of the container and/or to prevent agglomerations of particulate within the container. Such means can include, but are not limited to, agitators, augers, pneumatics, belt drives, internal structures, and the like.

Figure 10A:
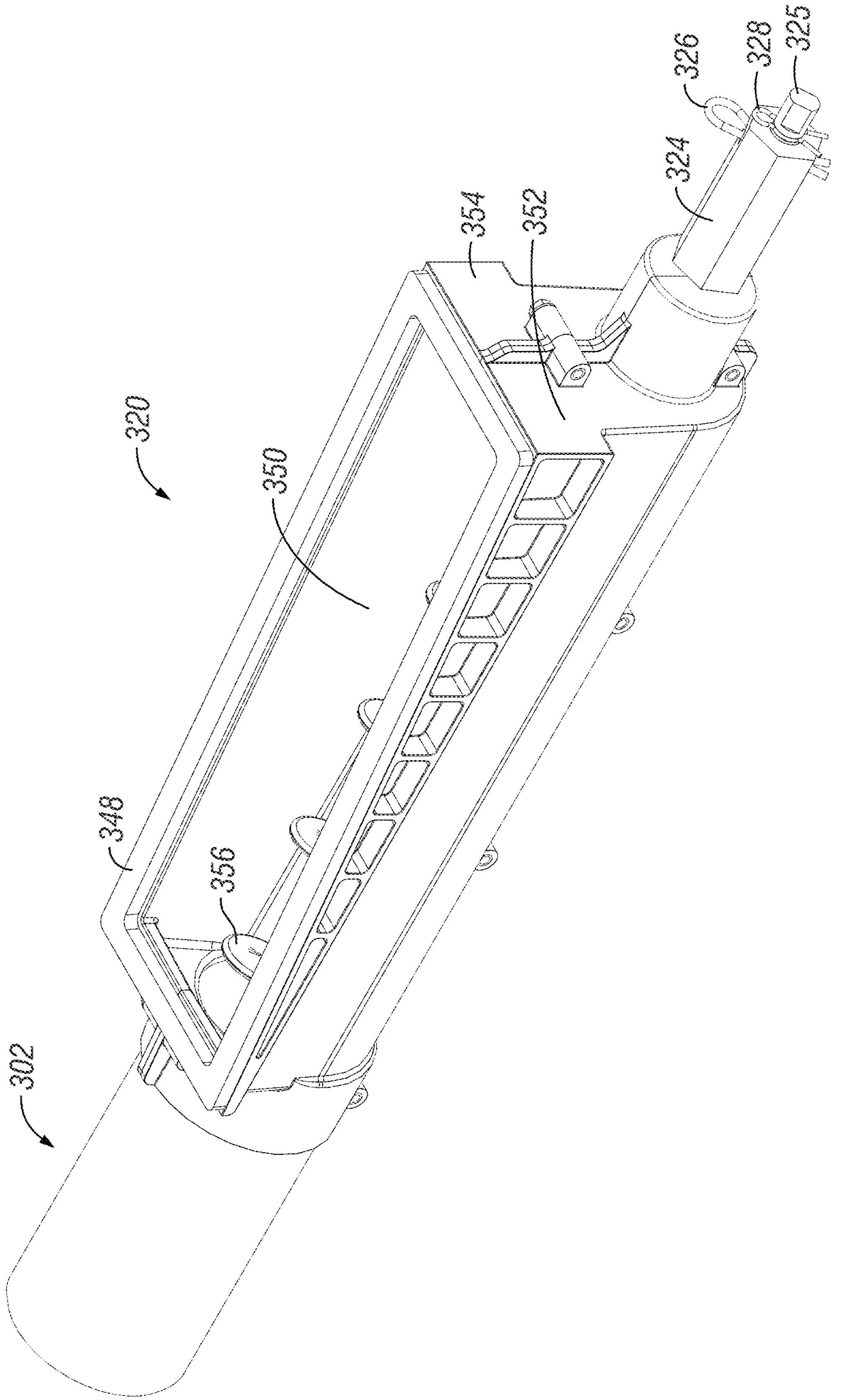
FIG. 10A is an isometric view of a cartridge in accordance with an illustrative embodiment.
Figure 10B:
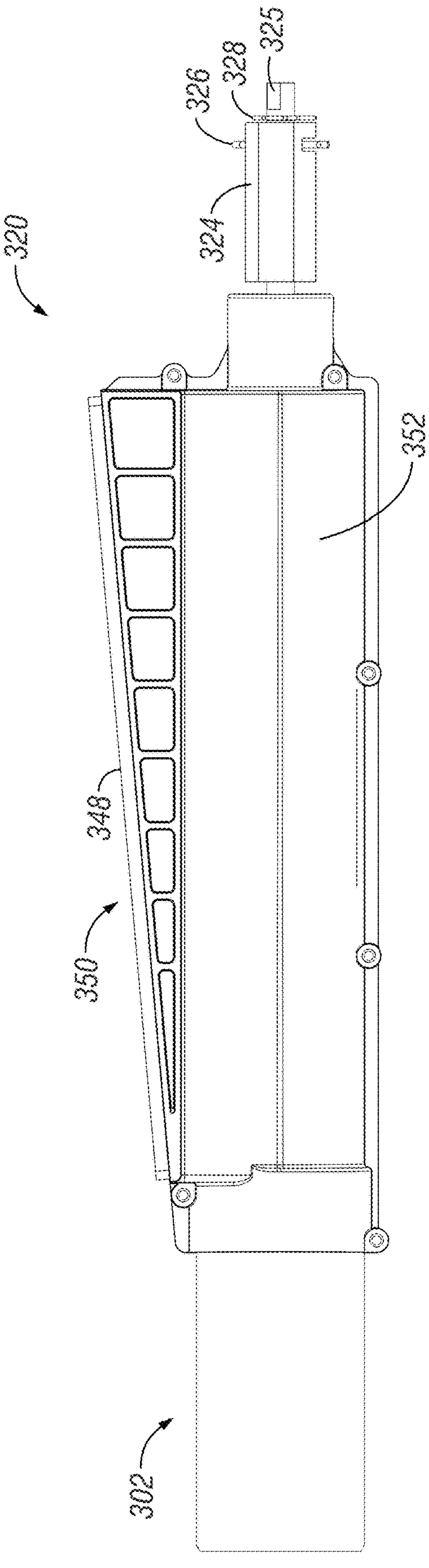
FIG. 10B is a side elevation view of a cartridge in accordance with an illustrative embodiment.
Figure 10C:
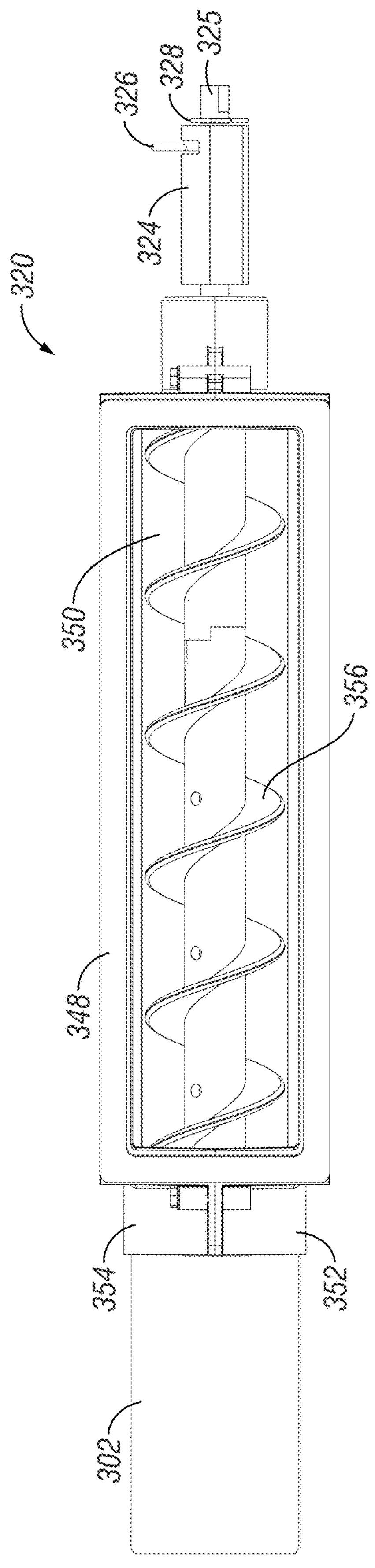
FIG. 10C is a top plan view of a cartridge in accordance with an illustrative embodiment.
Figure 10D:
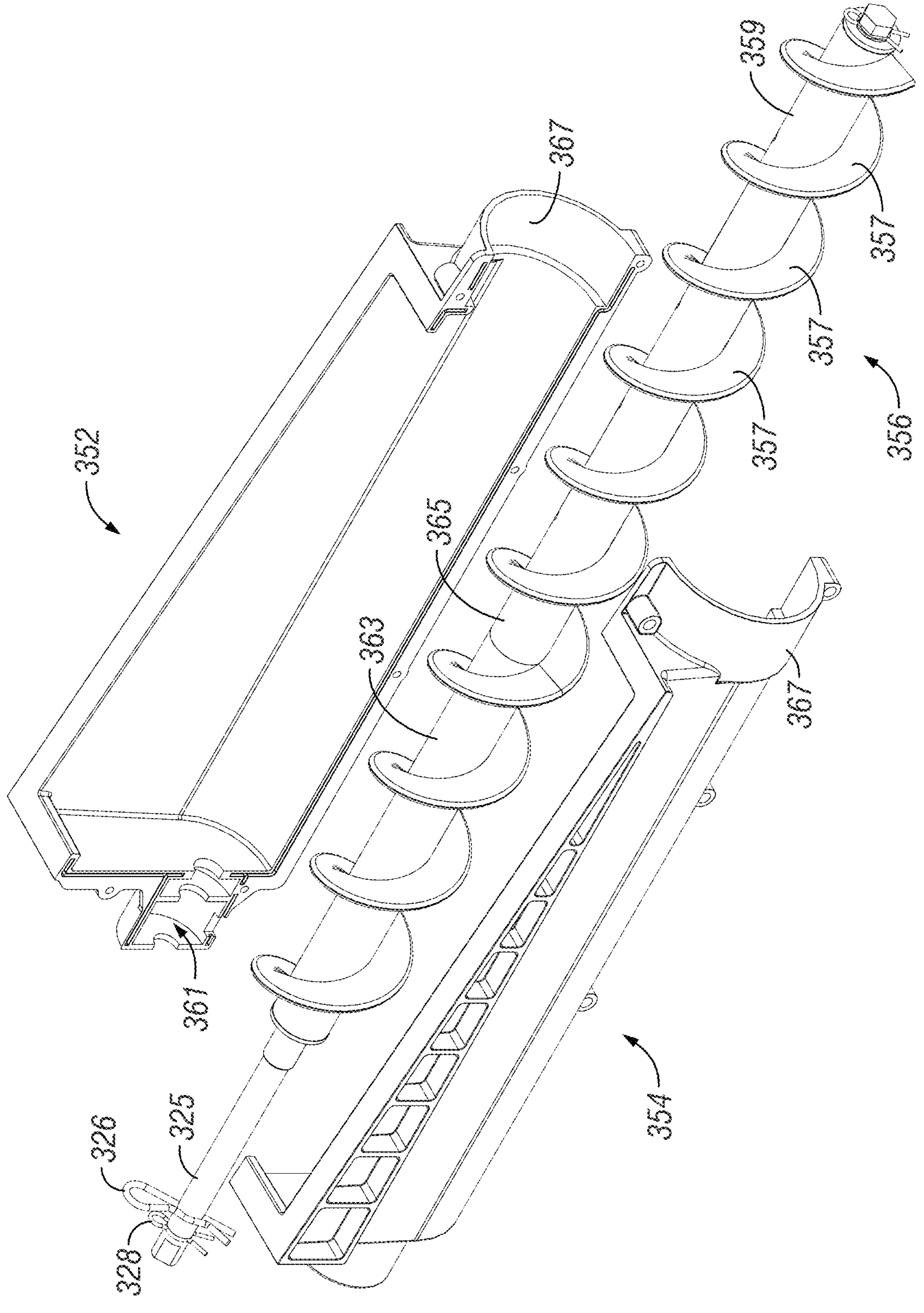
FIG. 10D is an exploded isometric view of a cartridge in accordance with an illustrative embodiment.

One or more scales (not shown) can be associated with each of the particulate containers 202 and 204. The scales can be operatively connected to a control system and configured to weigh each of the particulate containers 202 and 204. Together with one or more speed sensors 502 (FIG. 18) associated with one or more transmissions 306 (FIG. 18) discussed below, the system can provide real-time and/or post-operation feedback of the expected volume of particulate dispensed versus actual volume of particulate dispensed for each unit row of the field and/or for the overall particulate metering implement. To determine expected volume of particulate dispensed, speed sensors can measure the number of rotations of a shaft 359 with flightings 357, as shown illustratively in FIG. 10D. Based on the number and known dimensions of the flightings 357, including diameter and helix angle, an estimation of how much particulate is dispensed per revolution can be obtained. The estimation can be applied to each unit row for the particulate metering implement, each of which may be operating at varied rates. The total expected volume can then be compared to the change in weight (multiplied by the density of the particulate) as measured by the one or more scales associated with the particulate containers 202 and 204. Further, in an embodiment utilizing real-time feedback, the control system can make adjustments based on the data provided to reconcile the expected volume of particulate dispensed versus actual volume of particulate dispensed. Still further, the data can be used by the control system to diagnose dysfunctional screw conveyor(s) 356 and/or auger motor(s) 504 (FIG. 18), and/or identify potential blockages of particulate within the particulate metering implement.

Figure 6A:
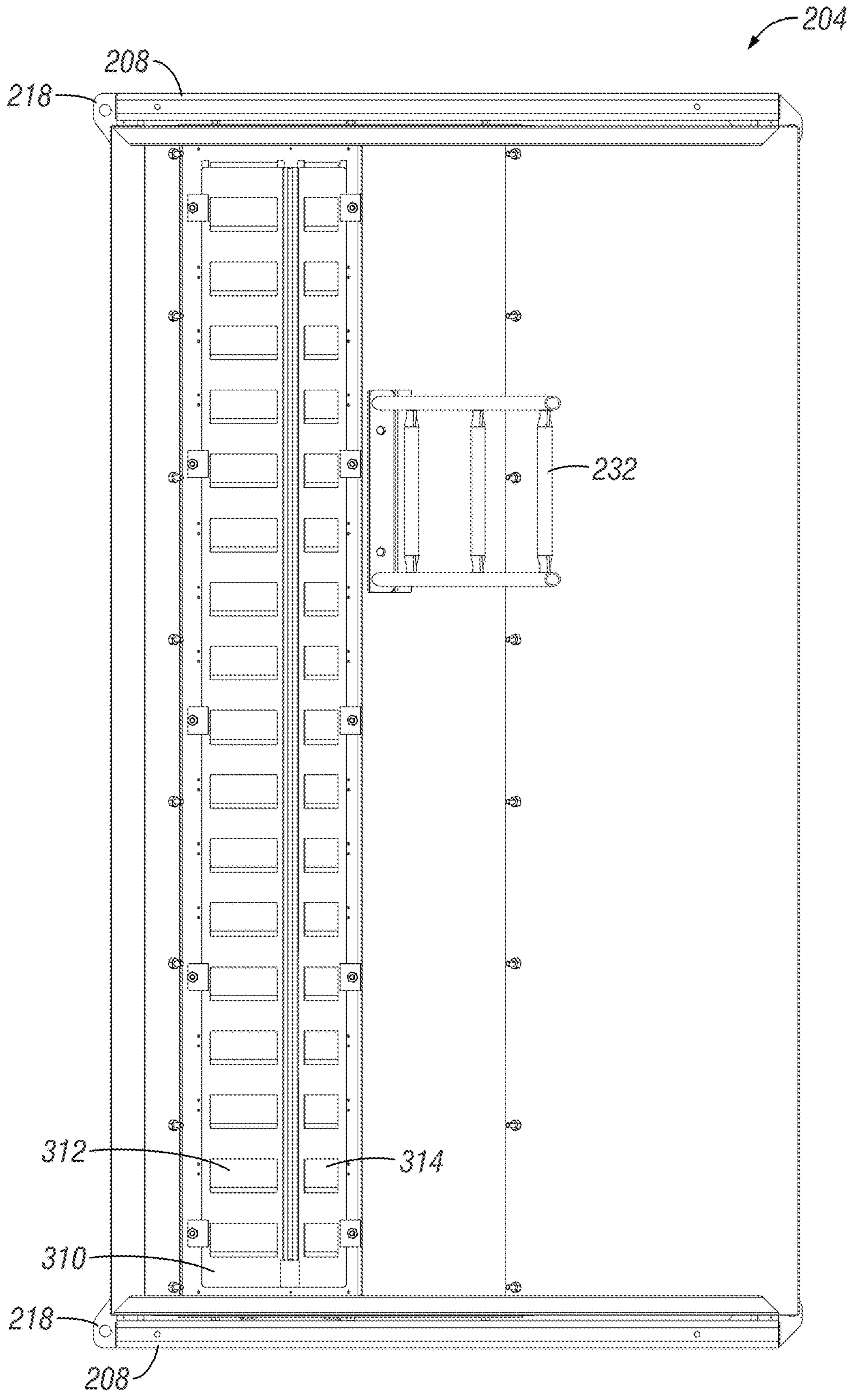
FIG. 6A is a cross-sectional view of the particulate container of FIG. 2 taken along section line 6-6.
Figure 6B:
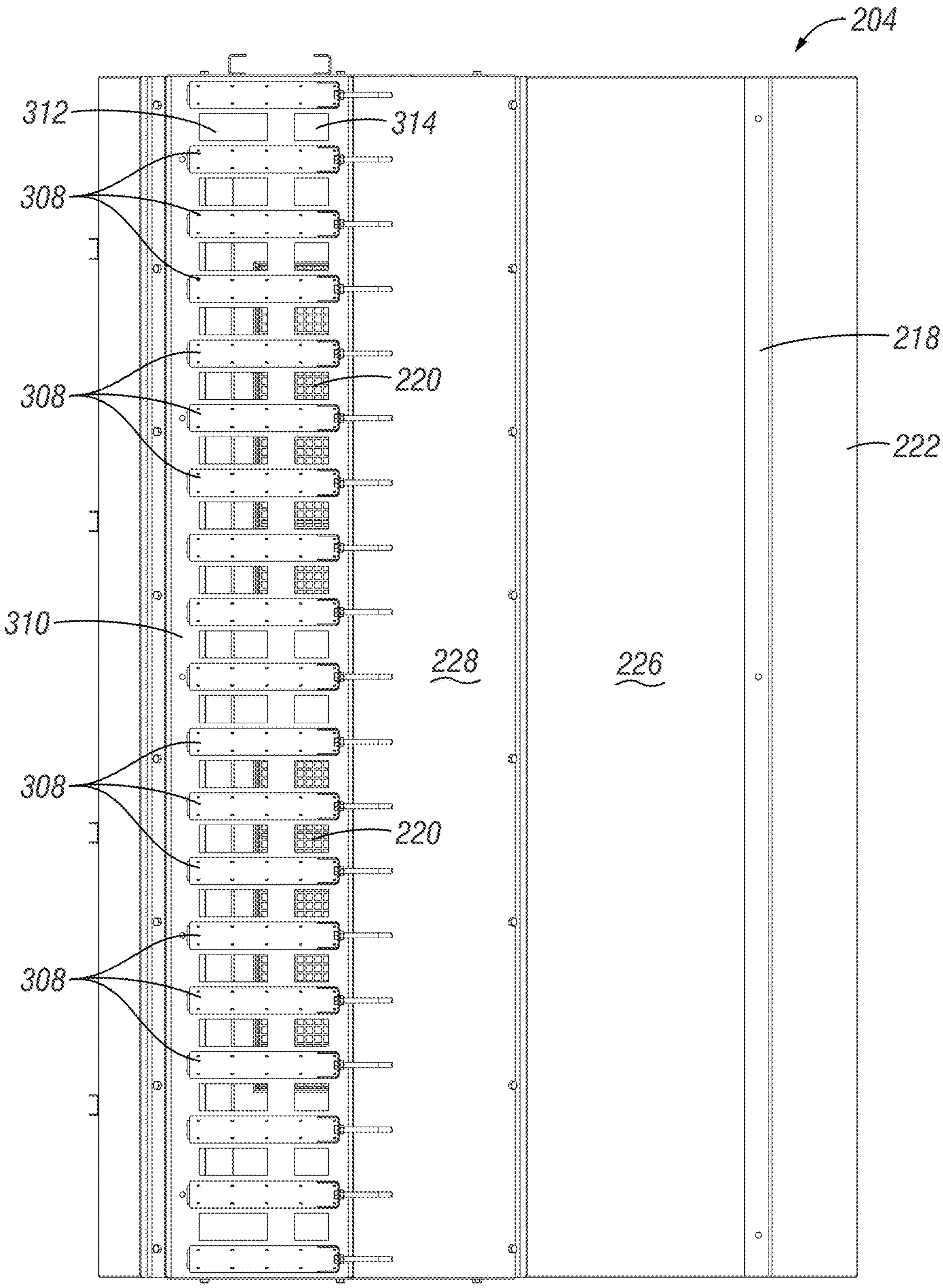
FIG. 6B is a bottom plan view of a particulate container in accordance with an illustrative embodiment.
Figure 7:
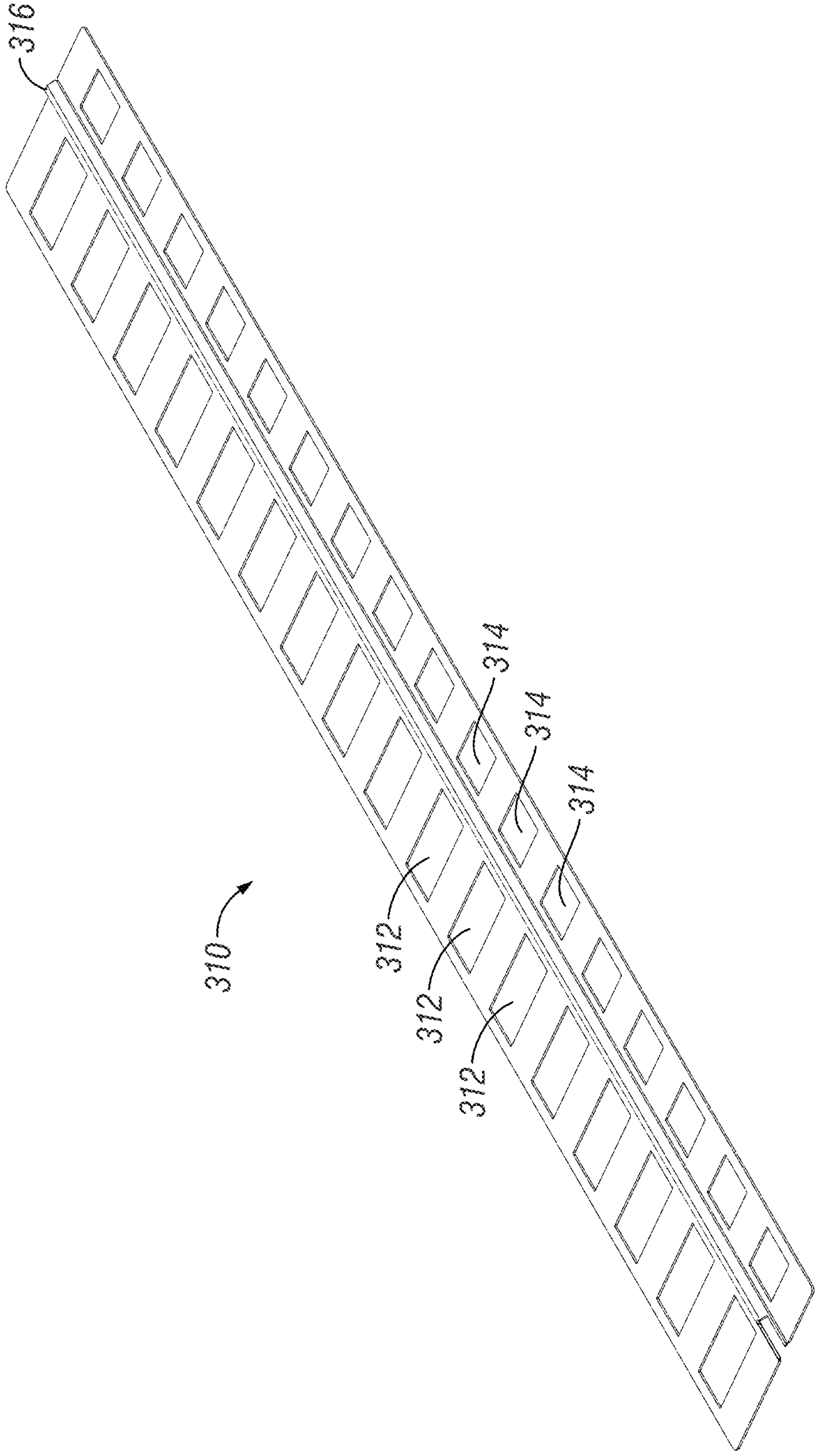
FIG. 7 is an isometric view of a bottom tray of a particulate container in accordance with an illustrative embodiment.

The particulate container 204 can include a bottom tray 310, as shown in FIGS. 5, 6A and 6B. The bottom tray 310 can include a plurality of large gates 312 and a plurality of small gates 314 arranged along the length of the bottom tray 310. The plurality of gates 312 and 314 can be square and/or rectangular, as shown, or can be of any shape to permit particulate to enter the particulate delivery system 300. Similarly, the plurality of gates 312 and 314 can all be the same shape and/or size, or of varied shapes and/or sizes based on the application. The interstitial portions of the bottom tray 310 can be flat, as shown, or can have a wedged-shape configuration to funnel particulate to the plurality of gates 312 and 314. The bottom tray 310 can be integrally connected to the lower portion 228 of the particulate container 204, or can be removable to permit a user to quickly install a different bottom tray 310 based on the application. As best shown illustratively in FIG. 7, the plurality of large gates 312 and the plurality of small gates 314 can be separated by a raised portion 316. The raised portion 316 can funnel the particulate into the plurality of large gates 312 and the plurality of small gates 314 and/or add structural support along the length of the bottom tray 310. Separating the particulate into a pairs of gates (e.g., large gates 312 and small gates 314) can minimize undesirable torquing of the screw conveyors 356 and auger motors 504 (FIG. 18), particularly during initialization of the particulate handling system 300.

A plurality of moveable and/or controllable gate covers (not shown) can be installed on plurality of gates 312 and 314. The gate covers, when closed, can prevent particulate from filling the short auger tubes 302 and/or long auger tubes 304, as shown illustratively in FIG. 8. The gate covers can be manually controlled or operatively controlled. The configuration can further increase the modularity of the metering system by limiting which discharge points (e.g., row units), if any, receive one or more of the types of particulate.

Figure 8:
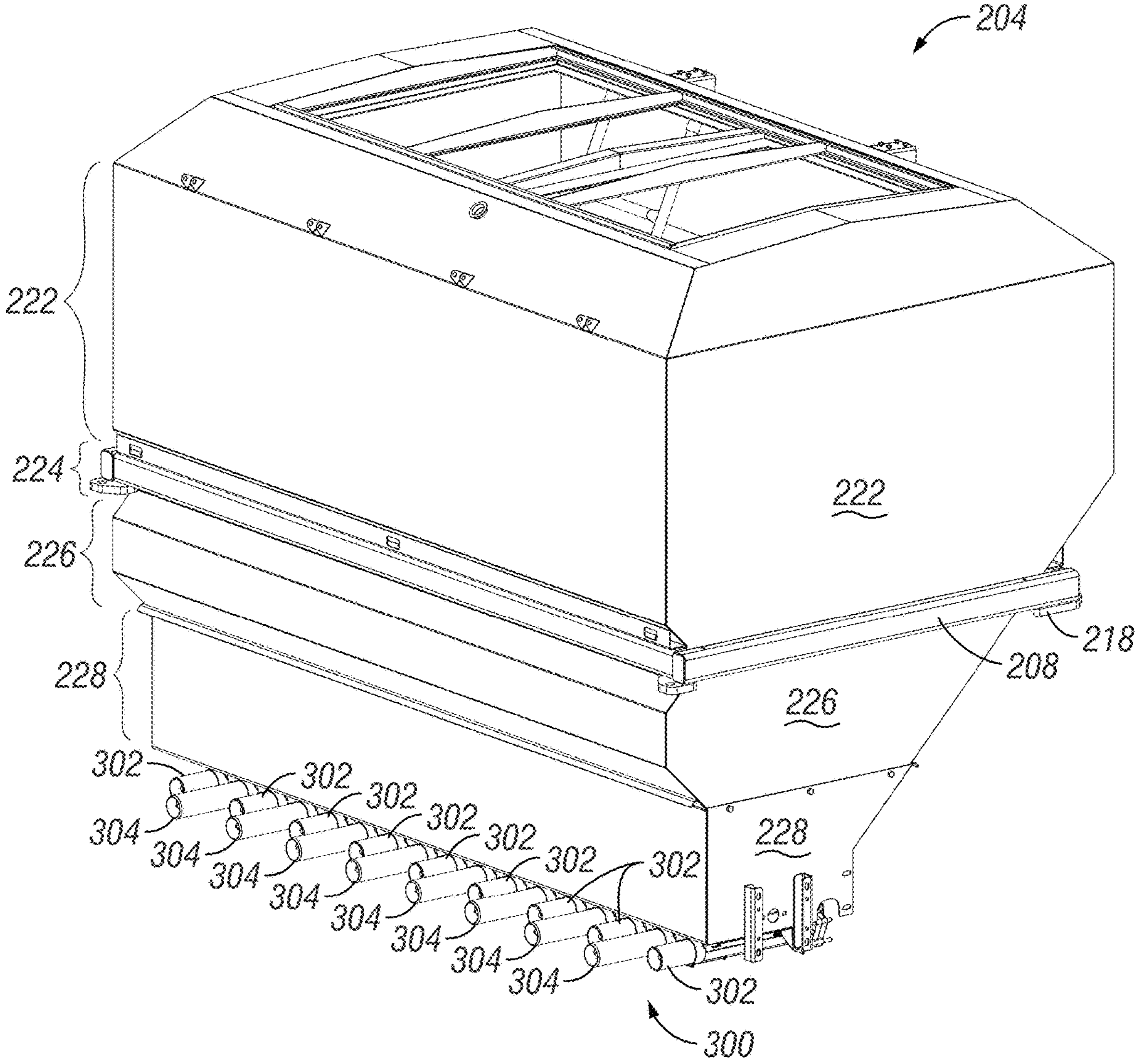
FIG. 8 is a is a front perspective view of a particulate container and a plurality of particulate handling systems in accordance with an illustrative embodiment.
Figure 12:
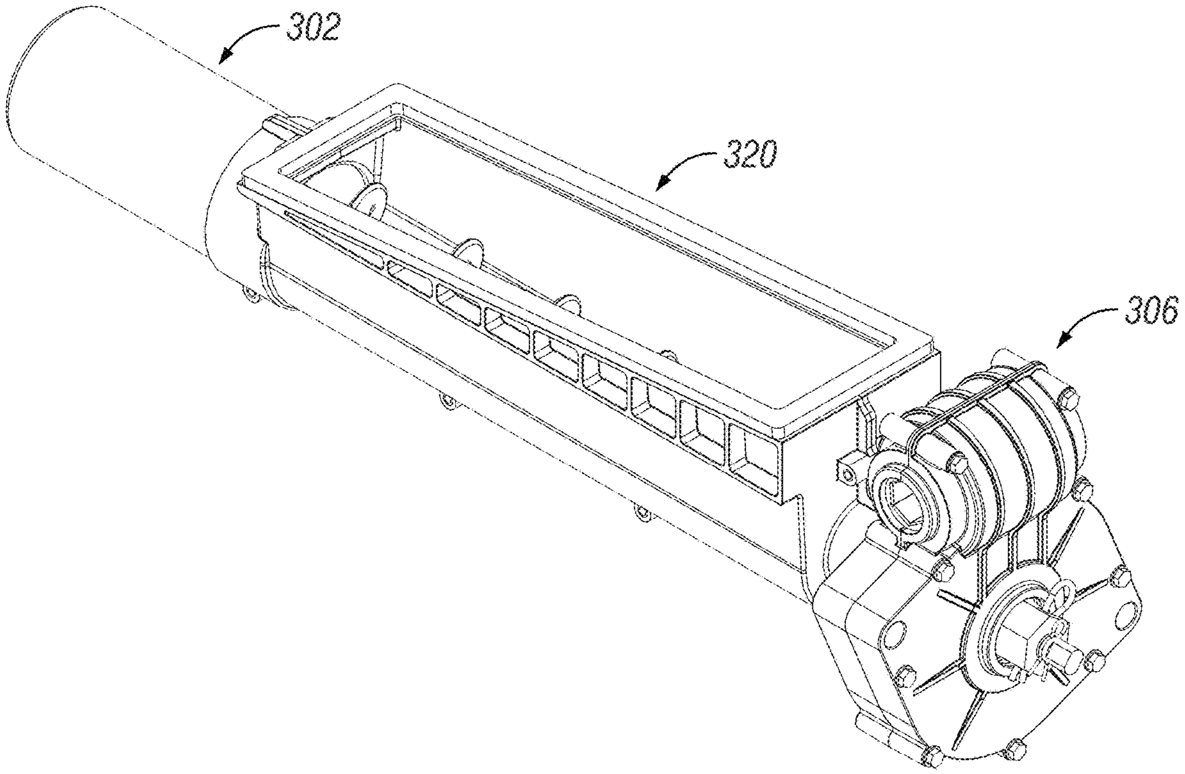
FIG. 12 is an isometric view of a particulate handling system in accordance with an illustrative embodiment.

Referring to FIG. 8, the particulate delivery system 300 can include a plurality of long auger tubes 304 and a plurality of short auger tubes 302. The plurality of long auger tubes 304 and the plurality of short auger tubes 302 can be alternately disposed in parallel below the bottom tray 310 (FIGS. 6A, 6B and 7) of the particulate container 204. The alternating of the long auger tubes 304 and the short auger tubes 302 can provide for a greater density of additional components disposed between particulate containers 202 and 204, and more particularly, a plurality of particulate accelerators, which will be discussed below. Each of the plurality of long auger tubes 304 and the plurality of short auger tubes 302 can extend from a cartridge 320 operatively connected to a gearbox 306, as shown illustratively in FIGS. 12 and 15.

Figure 9:
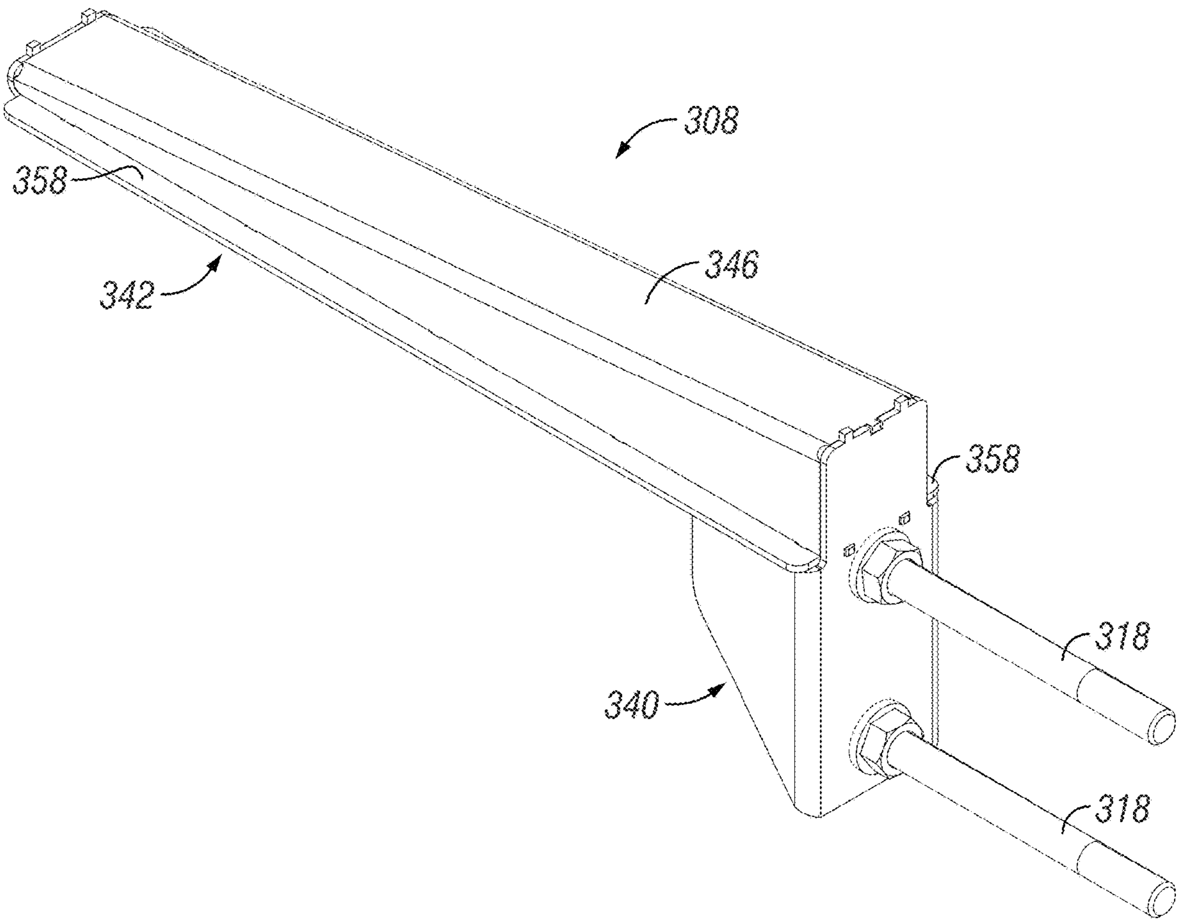
FIG. 9 is an isometric view of a hangar in accordance with an illustrative embodiment.
Figure 13:
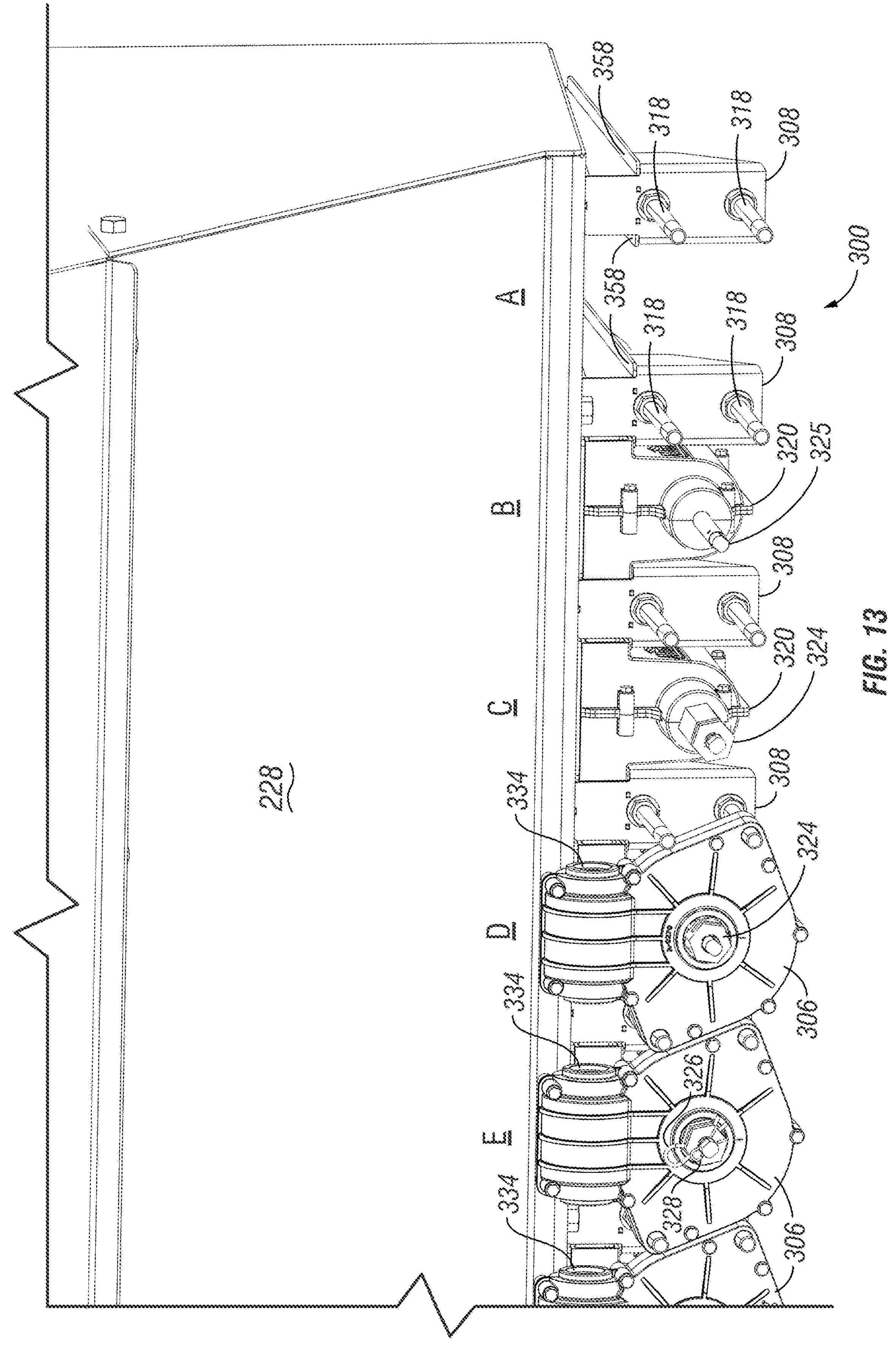
FIG. 13 is a front perspective view of the particulate handling system at various stages of installation in accordance with an illustrative embodiment.

As best shown illustratively in FIGS. 6B and 13, each of the cartridges 320 can be disposed between two hangars 308 affixed to the lower portion 228 of the particulate container 204. The upper surface 346 of the hangars 308, as shown illustratively in FIG. 9, can be welded to the container, or may be affixed by any means commonly known in the art, including but not limited to, nut and bolt, screws, rivets, soldering, and the like. The upper surface 346 of the hangars 308 can comprise a portion of an elongated container attachment member 342. Extending outwardly from the container attachment member 342 can be two guide surfaces 358 generally parallel to the upper surface 346. As discussed below, a guide surface 358 from adjacent hangars 308 can be adapted to receive a cartridge 320. The hangars 308 can include a gearbox attachment member 340 extending perpendicularly downward from the container attachment member 342. The gearbox attachment member 340 can contain two prongs 318. The prongs 318 can be cylindrical or can be of any shape commonly known in the art to engage and/or secure a gearbox 306. Further, while two prongs 318 are shown in FIG. 9, the present disclosure contemplates any number of prongs without deviating from the objects of the disclosure.

In an another embodiment, the plurality of long auger tubes 304 and the plurality of short auger tubes 302 can be secured below the bottom tray 310 by a support member (not shown) extending the length of the particulate container 204. The support member can be, for example, a generally U-shaped beam with a plurality of openings to support the cartridges.

An embodiment of the cartridge 320 is shown illustratively in FIGS. 10A, 10B, 10C and 10D. The cartridge 320 can include an input slot 350 sized and shaped to receive particulate passing through the plurality of large gates 312 and the plurality of small gates 314 in the bottom tray 310. An input slot interface 348 and a gasket (not shown) can seal the cartridge 320 to the inferior side of bottom tray 310. The seal can prevent particulate from escaping the system, particularly in instances where the particulate containers 202 and 204 are pressurized. The cartridge 320 can be constructed in two halves 352 and 354. Each of the two halves 352 and 354 can include a curved flange portion 367 adapted to receive a short auger tube 302 or a long auger tube 304. While two halves can provide for ease of manufacturing, the present disclosure also contemplates a unitary cartridge construction.

Within the input slot 350 of the cartridge 320 is a screw conveyor 356. In an illustrative embodiment shown in FIGS. 10C and 10D, the screw conveyor 356 can include a shaft 359 and flightings 357 as commonly known in the art. The shaft 359 can be comprised of two shaft sections 363 and 365. While the embodiment can utilize a screw conveyor, it can be appreciated by those skilled in the art that the disclosure covers other means of transmitting the material through a tube, including but not limited to, hydraulic pistons, pneumatics, slides, belts, and the like. External to the two halves 352 and 354 of the cartridge 320, the screw conveyor 356 can be coupled to an inner shaft 325. Each of the two halves 352 and 354 can include a second curved flange portion 361 adapted to receive a bearing that supports the inner shaft 325. Encircling the inner shaft 325 can be a drive shaft 324. The inner shaft 325 and the drive shaft 324 can be rotatably engaged with a pin 326. The axial position of the drive shaft 324 on the inner shaft 325 can be preserved through a pin 328 extending through the inner shaft 325 proximate to an edge of the drive shaft 324. The drive shaft 324 can be hexagonal to engage a drive shaft opening 341 in the gearbox 306, as shown illustratively in FIGS. 11A, 11B and 11C. The drive shaft 324 may be hexagonal as shown, or may be of any shape suitable to engage the gearbox 306 and achieve the objects of the disclosure. Further, the present disclosure envisions the inner shaft 325 and the drive shaft 324 being a unitary construction.

Figure 11A:
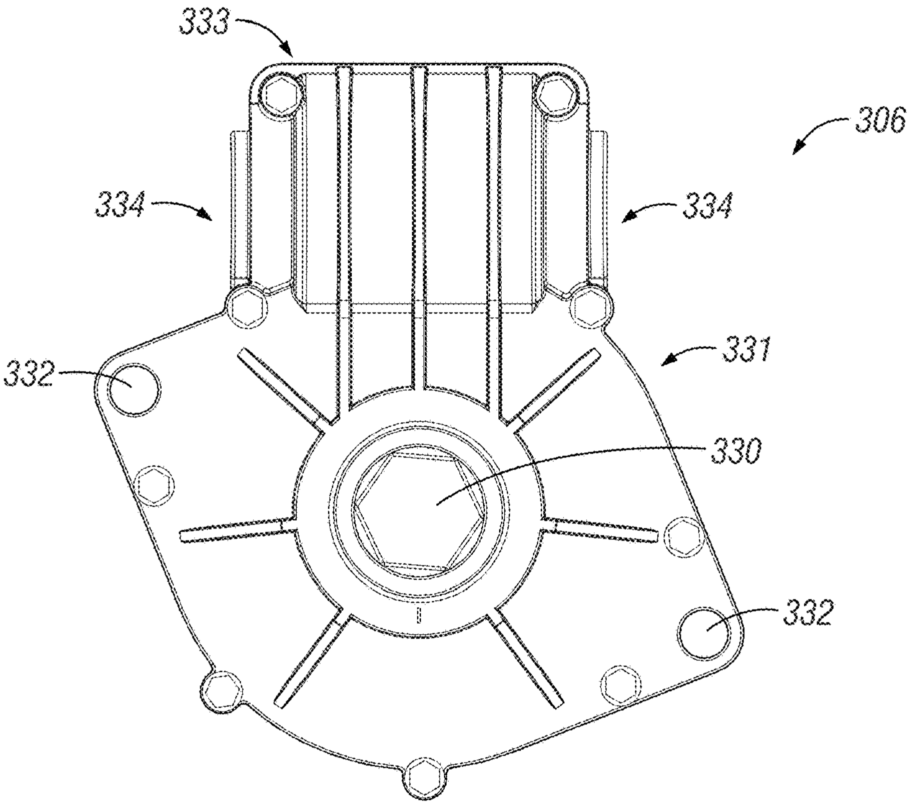
FIG. 11A is a front elevation view of a gearbox in accordance with an illustrative embodiment.
Figure 11B:
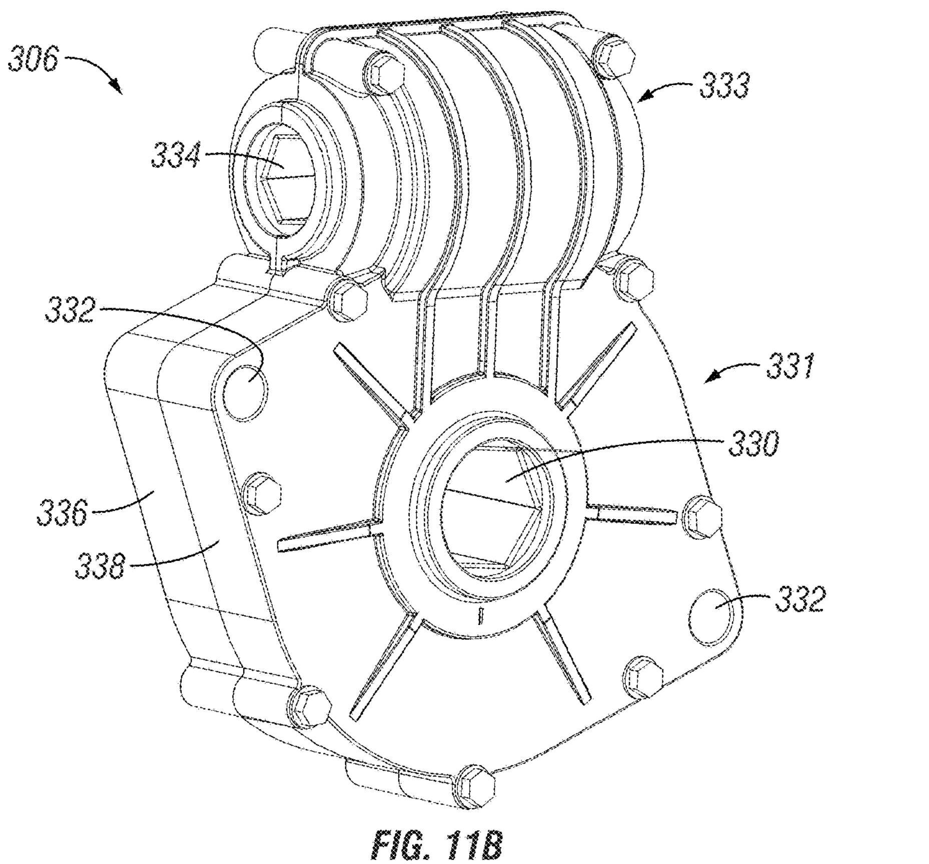
FIG. 11B is a front perspective view of a gearbox in accordance with an illustrative embodiment.
Figure 11C:
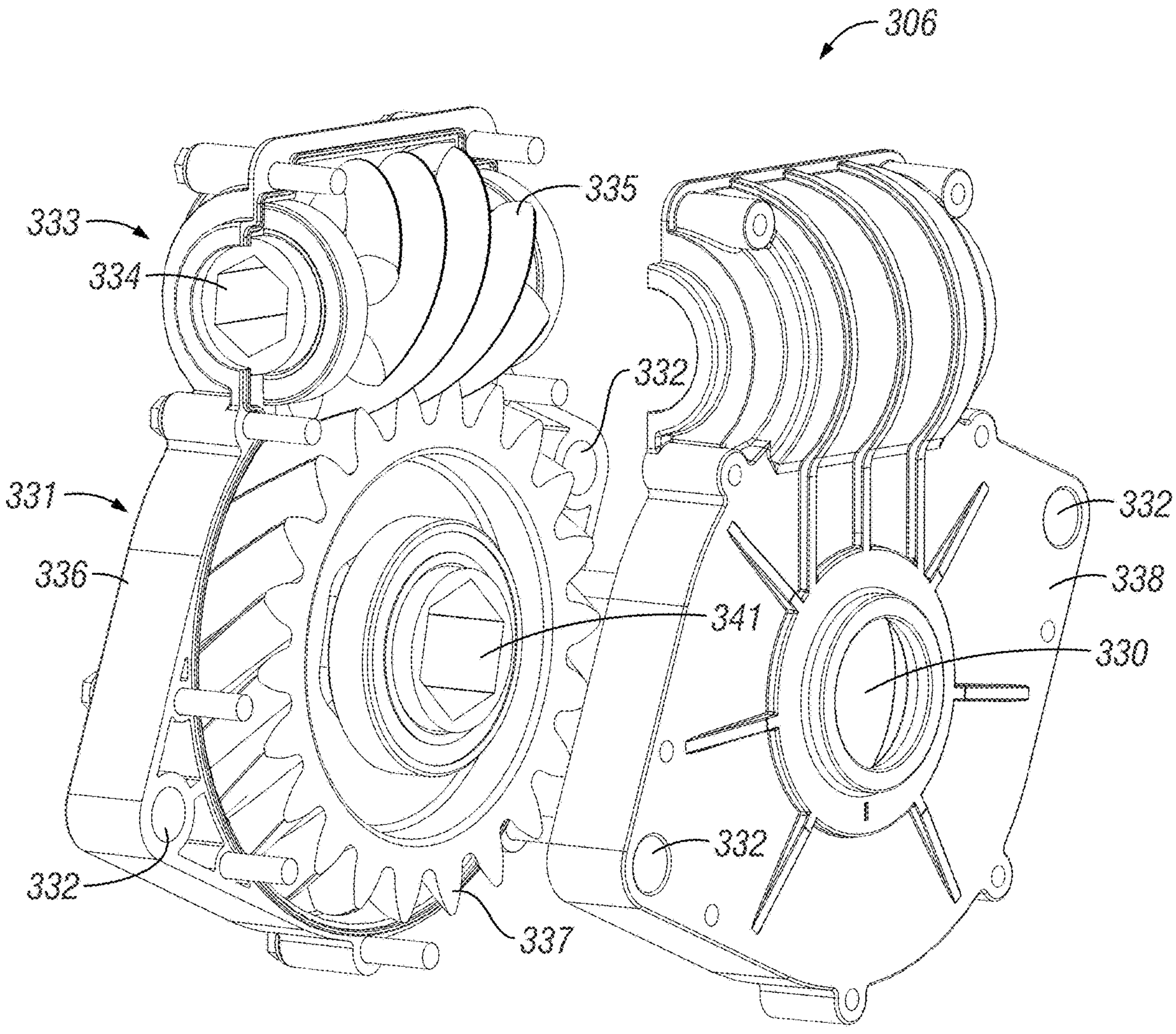
FIG. 11C is an exploded front perspective view of a gearbox in accordance with an illustrative embodiment.
Figure 18:
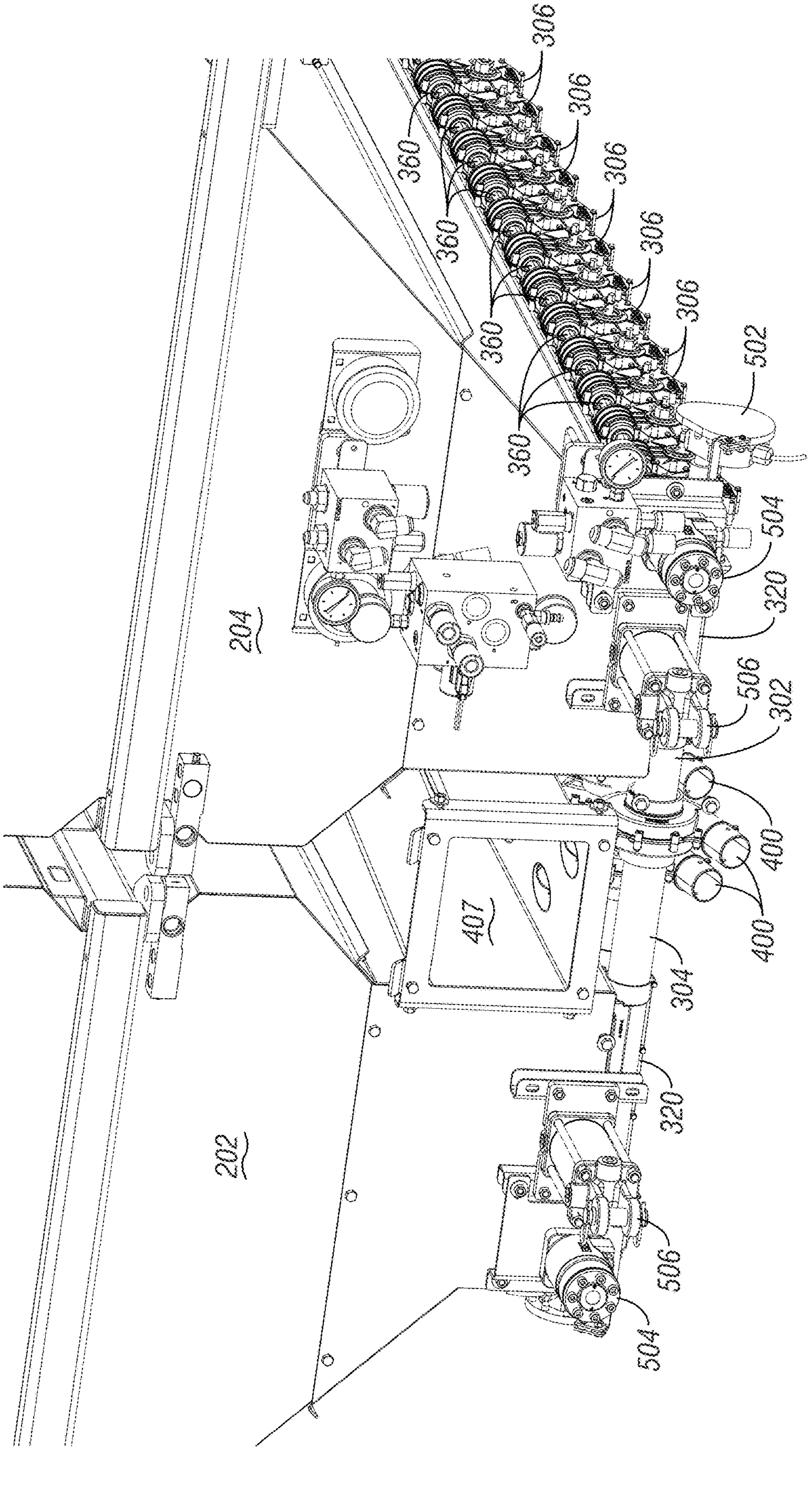
FIG. 18 is a front perspective view of a portion of a particulate metering implement in accordance with an illustrative embodiment.
Figure 20:
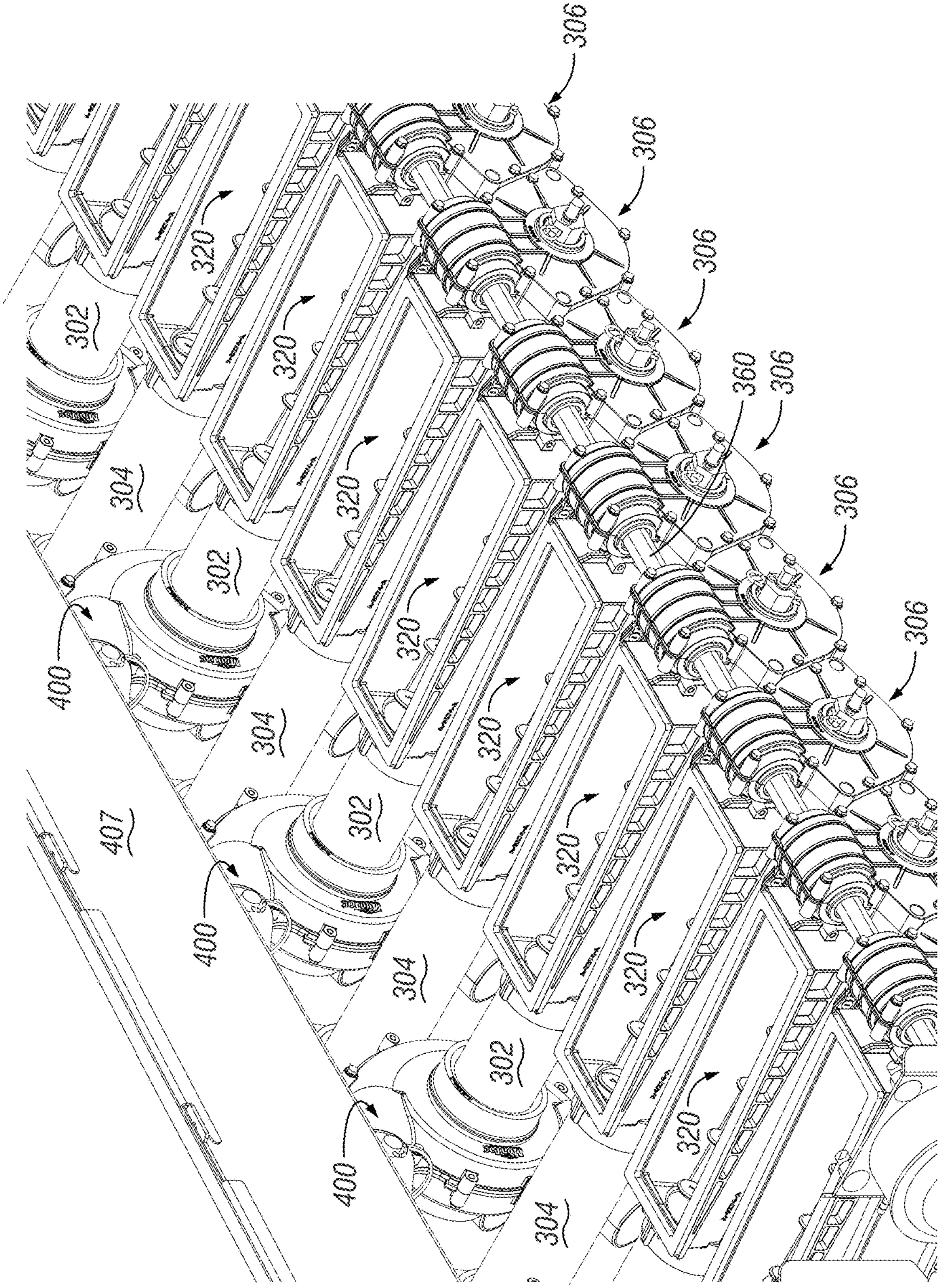
FIG. 20 is a front perspective view of a portion of a plurality of particulate handling systems and particulate accelerators in accordance with an illustrative embodiment.

A gearbox 306 is provided in FIGS. 11A, 11B and 11C. The gearbox 306 can be configured of two connectable halves 336 and 338 to provide for ease of manufacturing. The gearbox 306 can include an input portion 333 and an output portion 331. The input portion 333 can include a main shaft opening 334 extending through the input portion 333. The main shaft opening 334 can be adapted to receive and engage a main drive shaft 360 (FIGS. 18 and 20). In the illustrative embodiment of FIGS. 11A and 11B, the main shaft opening 334 is hexagonal, but can be of any shape suitable to achieve the objects of the disclosure. The main shaft opening 334 can comprise an inner portion of an input helical gear 335. As one or more gearboxes 306 can be connected in parallel, as discussed below, the main drive shaft 360 can span the length of the particulate container 204 and simultaneously drive multiple gearboxes 306, as shown illustratively in FIG. 18. The output portion 331 can include an opening 330 disposed within a first half 338 and a drive shaft opening 341 disposed on the second half 336. The drive shaft opening 341 can be adapted to engage the drive shaft 324 of the cartridge 320, as discussed above. The drive shaft opening 341 can comprise an inner portion of an output helical gear 337. The input helical gear 335 and output helical gear 337 can be in a crossed configuration, as shown in FIG. 11C. While the illustrative embodiment shows helical gears in a crossed configuration, the present disclosure contemplates any type of gearing needed to achieve the objects of the disclosure, including but not limited to, spur gears, bevel gears, spiral bevels, and the like. The drive shaft opening 341 can be orthogonal to main shaft opening 334, whereby each of the gearboxes 306 transfers the rotational speed and torque provided by the main drive shaft 360 to an associated screw conveyor 356 disposed within a cartridge 320. The present disclosure also contemplates other means for transferring the rotational speed and torque provided by the main drive shaft 360 to an associated screw conveyor 356, including but not limited to, electromagnetic induction, belts, and the like. The gearbox 306 can be connected to the prongs 318 of hangars 308 through mounting holes 332 disposed on each side on the gearbox 306.

In another embodiment, a motor can be operatively connected to each cartridge, thereby removing the need for a gearbox. In the embodiment, the plurality of motors can be connected to the plurality of screw conveyors 356 to control each of the plurality of screw conveyors 356. Each of the plurality of motors can be operatively connected to a control system to produce a desired speed of each screw conveyor 356, of a group or bank of the screw conveyors 356, or of all the screw conveyors 356.

FIG. 13 illustrates a plurality of particulate handling systems 300 at various stages of installation. Beginning below so-called Sector A, two hangars 308 can be connected to the bottom surface of the particulate container 204, as discussed above. The hangars 308 may be parallel to one another and spaced to provide for installation of a cartridge 320. The cartridge 320 may be installed by sliding a lower surface of the input slot 350 along guide surfaces 358, one from each of the adjacent hangars 308, as shown illustratively below Sector B. The advantageous design permits for ease of installation as well as removal and reinstallation should a cartridge 320 (and/or screw conveyor 356) need to be repaired or replaced with the same or different component. As illustrated below Sector C, the drive shaft 324 of the cartridge 320 can be installed over the inner shaft 325. The installation of the drive shaft 324 over the inner shaft 325 can occur either before or after the cartridge 320 has been installed between hangars 308. Thereafter, a gearbox 306 can be oriented such that the mounting holes 332 (FIG. 11C) are aligned with the prongs 318 on the hangars 308, as shown illustratively below Sector D. In such an orientation, the drive shaft opening 341 (FIG. 11C) can also be aligned with the drive shaft 324 of the cartridge 320. After installation of the gearbox 306 on the drive shaft 324, a pin 326 may be installed to rotatably engage inner shaft 325 and the drive shaft 324, and a pin 328 may be installed to axially secure the drive shaft 324 on the inner shaft 325, as shown illustratively below Sector E. Further, securing means commonly known in the art can be used to secure the gearbox 306 to the prongs 318. The installation process described above can be repeated for each row unit along the length of each of the particulate containers 202 and 204. The main drive shaft 360 can extend through and engage the main drive shaft openings 334 in each of the gearboxes 306.

Each of the gearboxes 306 can have a clutch (not shown) in operable communication with a control system. At the direction of the user or based on instruction from the control system, the control system can engage/disengage one or more predetermined clutches in order to activate/deactivate the associated one or more screw conveyors. In such an instance, the particulate metering system 100 can provide for section control.

Figure 14:
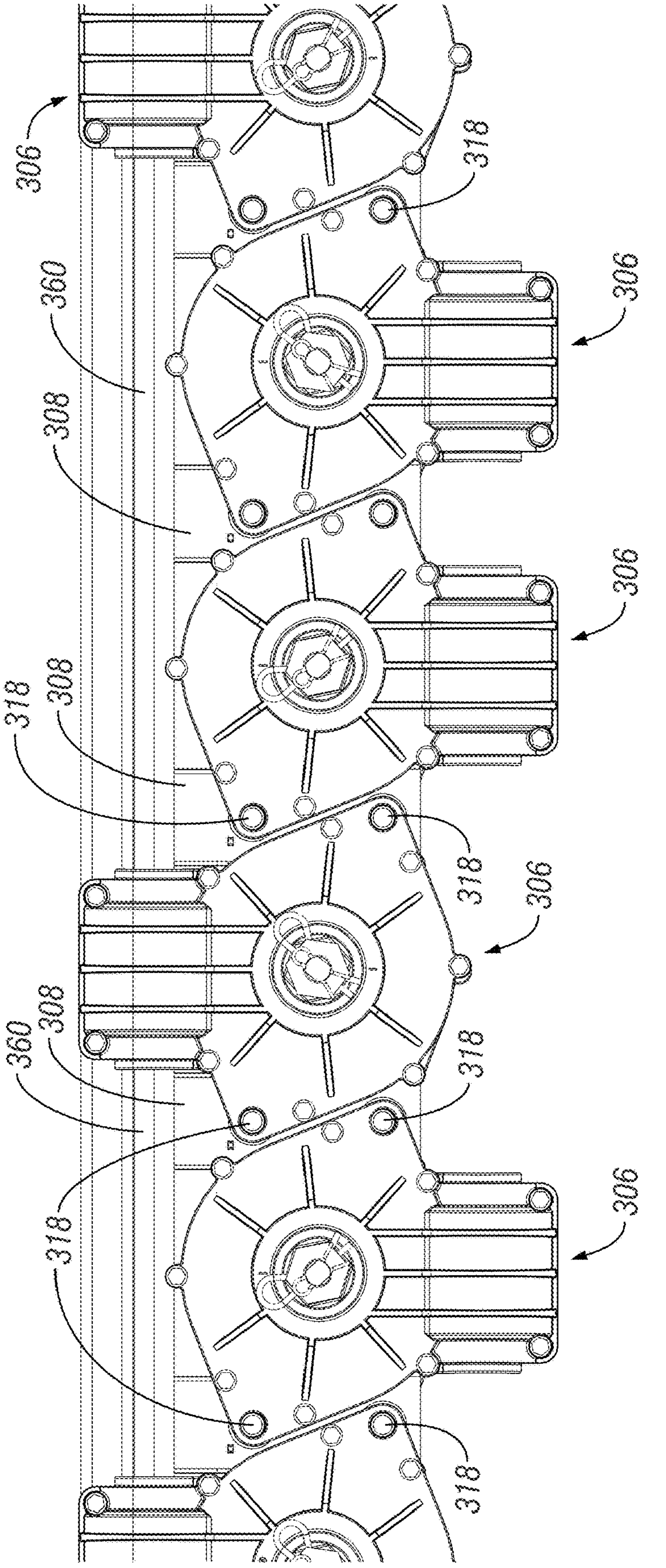
FIG. 14 is a front view of a plurality of gearboxes in configurations in accordance with an illustrative embodiment.

As shown illustratively in FIGS. 13 and 14, each of the two prongs 318 of the one hangar 308 can be connected to adjacent gearboxes 306. In other words, an upper prong of a hangar can be connected to one gearbox while a lower prong of the same hangar can be connected to an adjacent gearbox. The arrangement is due to an advantageous design of the gearbox 306, which can permit one or more gearboxes 306 to be removed, inverted and reattached to the same two prongs as previously connected, as shown illustratively in FIG. 14. The inversion of a gearbox 306 can provide several advantages over the state of the art. First, in an inverted position, one or more of the gearboxes 306 can be disengaged from the main drive shaft 360 based on the needs of the application (e.g., in at least one instance, where one or more of the rows in the field does not require particulate metering). Second, a second main drive shaft (not shown) can be implemented and adapted to engage the one or more gearboxes 306 placed in an inverted position. The second main drive shaft can also extend the length of the particulate container 204 and can be parallel to the main drive shaft 360. In such an embodiment, the user can invert one gearbox or can invert multiple gearboxes to permit desired groupings of the same (e.g., every four gearboxes, every other gearbox, etc.) based on the needs of the operation/application. Furthermore, together with the same opinion for the companion particulate handling system 300 associated with the second particulate container 202, the potential configurations can permit precise control over the blends of the particulate from the containers as well as application rates in which the blends are metered.

Figure 15:
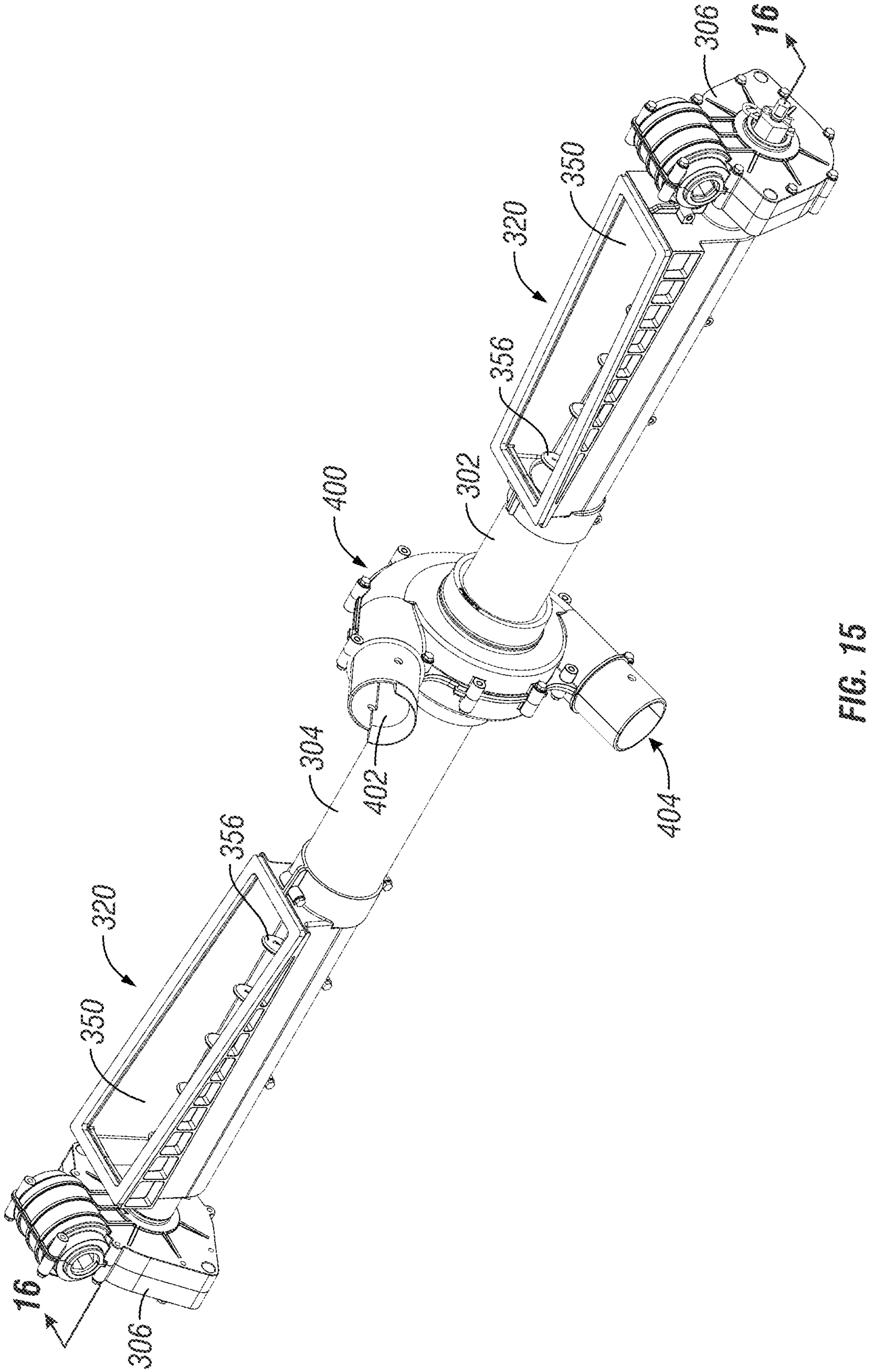
FIG. 15 is an isometric view of two particulate handling systems and a particulate accelerator in accordance with an illustrative embodiment.
Figure 16:
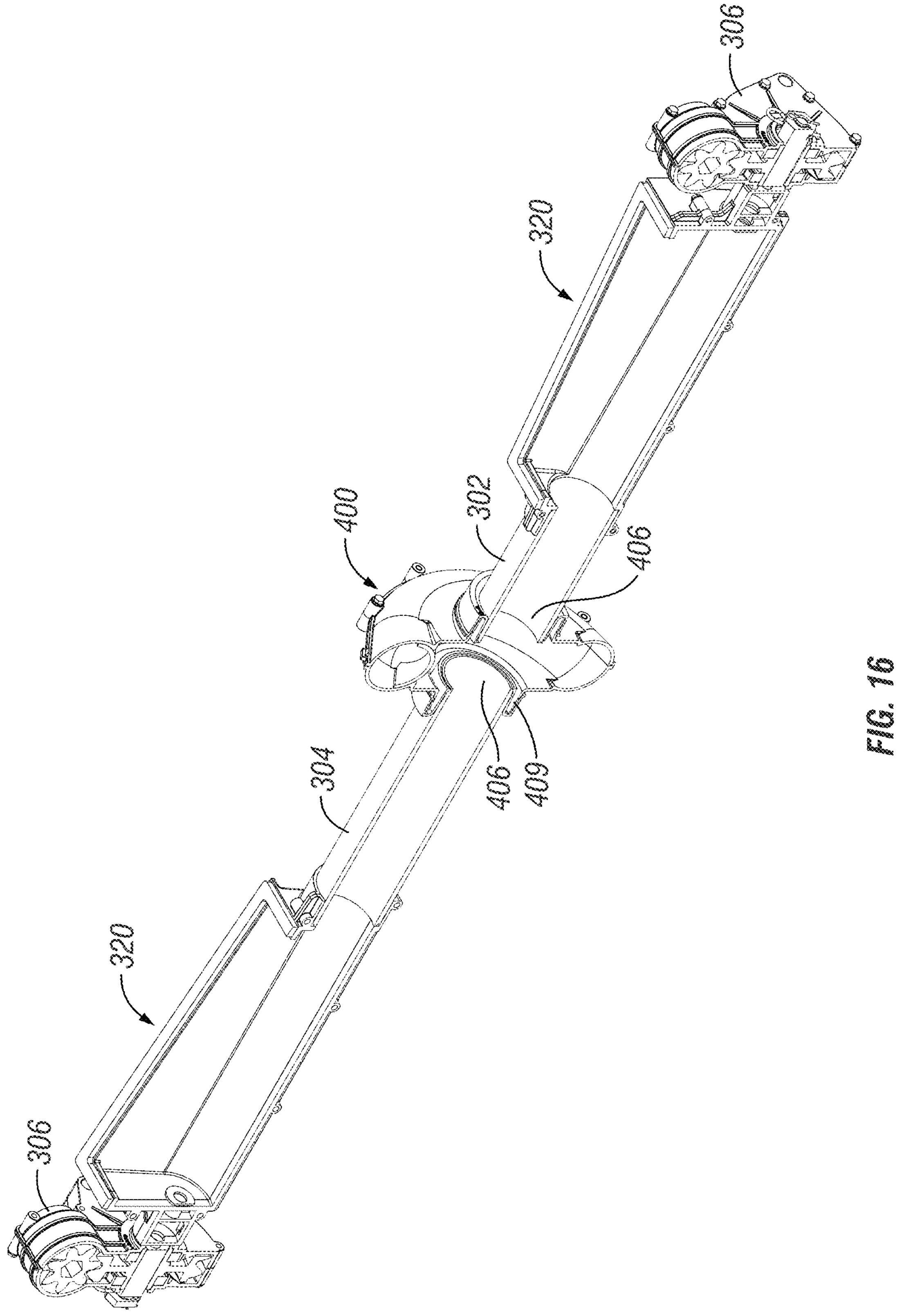
FIG. 16 is a cross-sectional view of the two particulate handling systems and a particulate accelerator of FIG. 15 taken along section line 16-16.

FIGS. 15 and 16 show companion particulate handling systems connected to a particulate accelerator 400. In particular, the short auger tube 302 and long auger tube 304 extending from cartridges 320 can interface with a particulate accelerator 400 at interfaces 406. Referring to FIG. 16, a gasket 409 can seal the short auger tube 302 and the particulate accelerator 400 and long auger tube 304 and the particulate accelerator 400. The gasket 409 can provide the appropriate seal while accounting for the flexing required of the short auger tube 302 and long auger tube 304 within the particulate accelerators due to movement of the cartridges 320 (as the particulate containers 202 and 204 are emptied, experience vibration, and the like).

Figure 19:
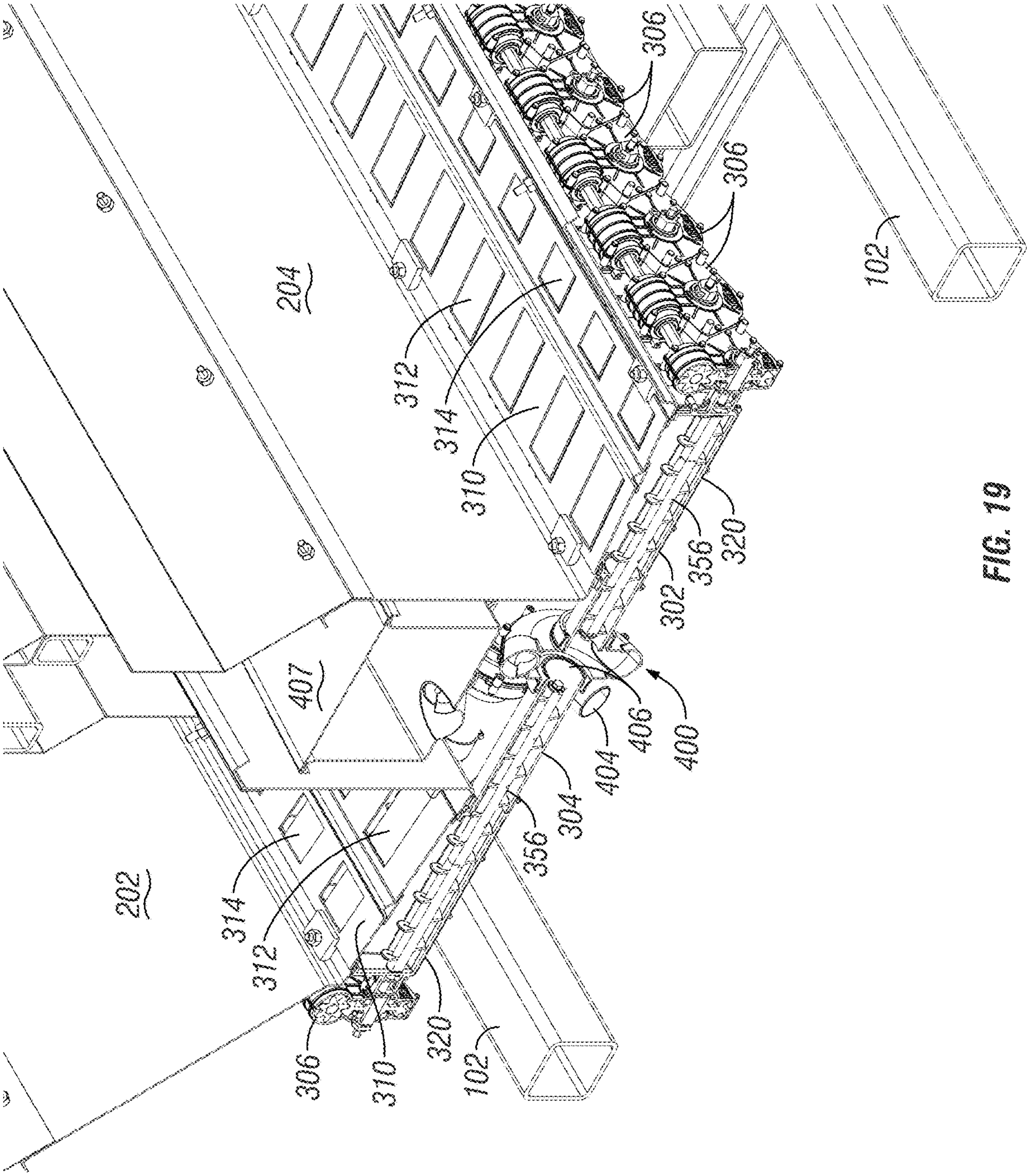
FIG. 19 is a front perspective view of a portion of a particulate container system in accordance with an illustrative embodiment.

In operation, particulate within the particulate container 204 can pass through the plurality of large gates 312 and a plurality of small gates 314 of the bottom tray 310 and the input slots 350 of the plurality of cartridges 320, as shown illustratively in FIGS. 15, 19 and 20. Referring to FIG. 20, the main drive shaft 360 can be connected to the plurality of gearboxes 306. Upon receiving an input force from the auger motor 504 via the gearbox 306, the drive shaft 324 rotates the screw conveyors 356. The flightings 357 of the screw conveyors 356 can transmit the particulate contained within the short auger tube 302 and the longer auger tube 304 towards interfaces 406, as shown illustratively in FIGS. 16 and 20. The speed at which the screw conveyor 356 rotates can be measured by a speed sensor 502 (FIG. 18). As best shown in FIG. 20, the process described above can also occur for each unit row along the length of the particulate containers 202 and 204. The auger motor 504 associated with a subset of particulate handling systems 300 of the particulate container 204 can be independently controlled from the auger motor 504 associated with a subset of particulate handling systems 300 of the particulate container 202, thereby providing for variable blend of the types of particulate. Together with inversion of one or more gearboxes and/or auger motors operatively connected to each screw conveyor, a user can have precise control over the blend of the types of particulate and the application rate at which the blend is metered into the particulate accelerators.

Figure 17:
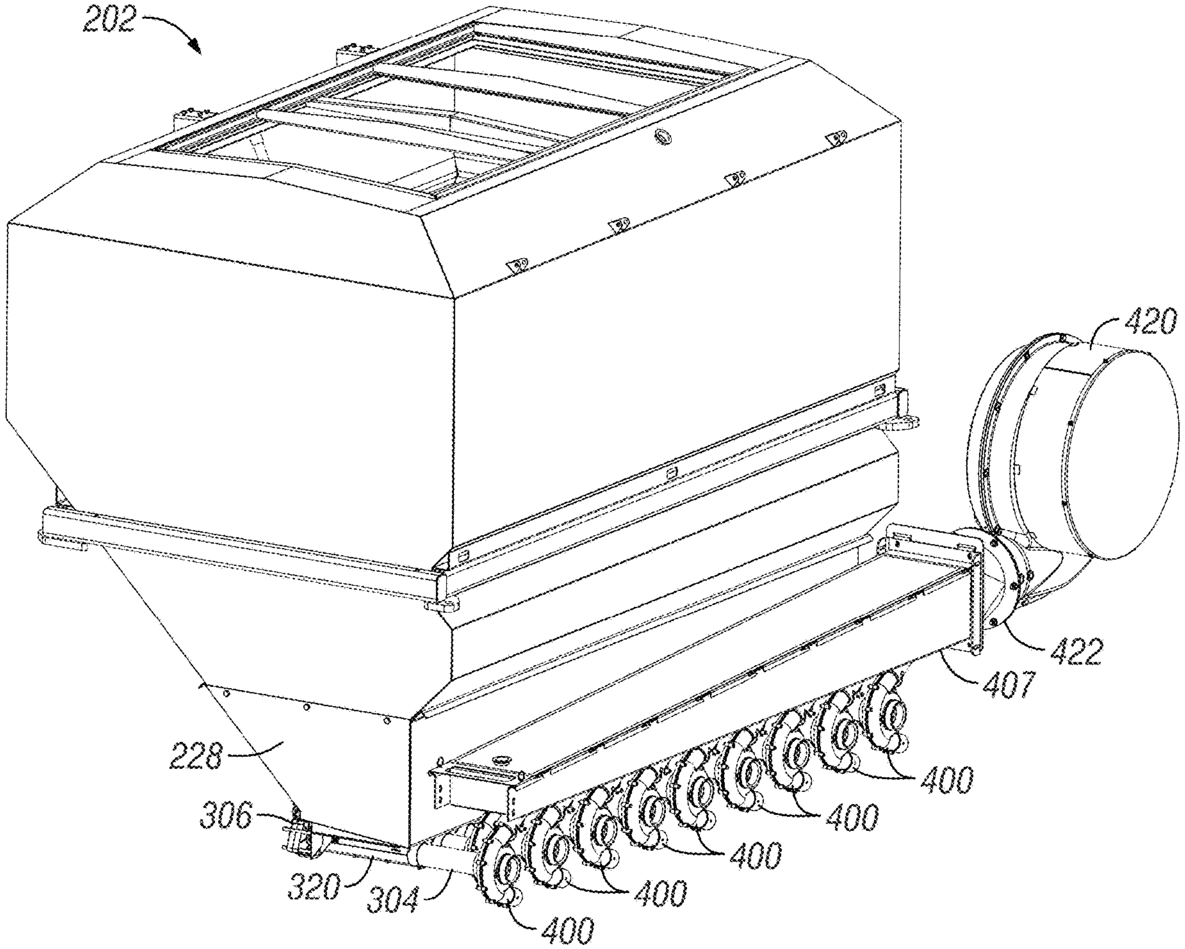
FIG. 17 is a front perspective view of a portion of a particulate container system in accordance with an illustrative embodiment.

Referring to FIGS. 15-17, the particulate accelerator 400 can include an inlet 402 and an outlet 404. The inlet 402 can be in fluid connection with the plenum 407. Further, the particulate accelerators 400 can be arranged in two rows along the length of the plenum 407. The two rows of particulate accelerators 400 along the length of the plenum 407 can be staggered longitudinally to maximize compactness of the same and/or to impart desired airflow characteristics.

The plenum 407 has an intake 410 that is in fluid communication with a blower 420, as shown illustratively in FIG. 17, and can be connected via a blower coupler 422. The plenum 407 and/or blower coupler 422 can be made of steel, but the disclosure contemplates other materials such as aluminum, polymers, composites, ceramics, and the like.

After passing through the plenum 407 and the blower coupler 422, air generated by the blower 420 can enter the particulate accelerators 400. Further, as discussed above, the screw conveyors 356 can transmit the particulate contained within the short auger tube 302 and the longer auger tube 304 towards particulate accelerators 400, as shown illustratively in FIG. 20. Upon reaching the particulate accelerators 400, the particulate blend can descend vertically within the particulate accelerators 400 due to the force of gravity. The air tracking around a curved back wall of the particulate accelerators 400 can create an acute angle with the vertically descending particulate. The acute angle can minimize the directional change of the particulate needed to exit the particulate accelerator 400. The air can further provide a fluid bed of air upon which the particulate blend is suspended as it exits particulate accelerator 400 through outlet 404. The particulate blend can then enter a hose (not shown) and be metered to a discharge point in any manner commonly known in the art. The process described above can occur simultaneously in each particulate accelerator 400 disposed along the length of the plenum 407.

The disclosure is not to be limited to the particular embodiments described herein. In particular, the disclosure contemplates numerous variations in the type of ways in which embodiments of the disclosure can be applied to particulate handling systems with variable blend and variable application rate controls for particulate matter. The foregoing description has been presented for purposes of illustration and description. It is not intended to be an exhaustive list or limit any of the disclosure to the precise forms disclosed. It is contemplated that other alternatives or exemplary aspects that are considered included in the disclosure. The description is merely examples of embodiments, processes or methods of the disclosure. It is understood that any other modifications, substitutions, and/or additions can be made, which are within the intended spirit and scope of the disclosure. For the foregoing, it can be seen that the disclosure accomplishes at least all that is intended.

The previous detailed description is of a small number of embodiments for implementing the disclosure and is not intended to be limiting in scope. The following claims set forth a number of the embodiments of the disclosure with greater particularity.

What is claimed is:

1. A dry particulate handling system for a particulate meter, the dry particulate handling system comprising:

a plurality of particulate storage areas;

a plurality of types of dry particulate, a first one of the plurality of types of dry particulate housed in a first one of the plurality of particulate storage areas;

a first set of particulate conveyors in operable communication with the first one of the plurality of particulate storage areas, each of the first set of particulate conveyors being housed within a first removable cartridge;

a second set of particulate conveyors in operable communication with a second one of the particulate storage areas, each of the second set of particulate conveyors being housed within a second removable cartridge, the second set of particulate conveyors being collinear with the first set of particulate conveyors;

a drive system in operable control of the first set of particulate conveyors and the second set of particulate conveyors;

a particulate mixing chamber having a first inlet for particulate and a second inlet for particulate where the first inlet and the second inlet are located on opposite sides of the mixing chamber, the first inlet in communication with a particulate conveyor from the first set of particulate conveyors and the second inlet in communication with a particulate conveyor from the second set of particulate conveyors;

wherein the first set of particulate conveyors conveys the first one of the plurality of types of dry particulate into an air flow path configured to receive air accelerated by an air flow source, the air flow path located within the particulate mixing chamber to receive the particulate from the first inlet and the second inlet;

wherein the second set of particulate conveyors conveys the second one of the plurality of types of dry particulate into the air flow path; and wherein the first one of the plurality of types of dry particulate and/or the second one of the plurality of types of dry particulate are dispensed from the particulate handling system as dry product.

2. The particulate handling system of claim 1 wherein the drive system further comprises:

a. a first drive system in operable control of the first set of particulate conveyors;

b. a second drive system in operable control of the second set of particulate conveyors, wherein the first drive system and the second drive system operate independently.

3. The particulate handling system of claim 2 wherein the first drive system and the second drive system operate at varied speeds.

4. The particulate handling system of claim 1 wherein the particulate mixing chamber receives at least one of the first or second one of the plurality of types of dry particulates.

5. The particulate handling system of claim 1, further comprising:

one or more metering controls in operable control with the first set of particulate conveyors and the second set of particulate conveyors.

6. The particulate handling system of claim 1 wherein the first set of particulate conveyors and the second set of particulate conveyors comprise augers.

7. The particulate handling system of claim 1, further comprising:

one or more metering controls associated with the plurality of particulate storage areas, wherein the one or more metering controls obtain data from each of the plurality of particulate storage areas, wherein the one or more metering controls operably control the first set of particulate conveyors and the second set of particulate conveyors based at least on the data.

8. The particulate handling system of claim 1 further comprising:

at least one directional bend in the air flow path within the particulate mixing chamber.

9. A dry particulate handling system for a particulate meter, the dry particulate handling system comprising:

a plurality of particulate storage areas;

a plurality of types of dry particulate, a first one of the plurality of types of dry particulate housed in a first one of the plurality of particulate storage areas;

a first set of particulate conveyors in operable communication with the first one of the plurality of particulate storage areas;

a second set of particulate conveyors in operable communication with a second one of the particulate storage areas, the second set of particulate conveyors being collinear with the first set of particulate conveyors;

a bottom tray located between each of the plurality of storage areas and the first and the second set of particulate conveyors, the bottom tray having a plurality of large gates, a plurality of small gates and a wedged-shaped configuration to funnel particulate to the plurality of large and small gates;

a drive system in operable control of the first set of particulate conveyors and the second set of particulate conveyors;

a particulate mixing chamber having a first inlet for particulate and a second inlet for particulate where the first inlet and the second inlet are located on opposite sides of the mixing chamber, the first inlet in communication with a particulate conveyor from the first set of particulate conveyors and the second inlet in communication with a particulate conveyor from the second set of particulate conveyors;

wherein the first set of particulate conveyors conveys the first one of the plurality of types of dry particulate into an air flow path configured to receive air accelerated by an air flow source, the air flow path located within the particulate mixing chamber to receive the particulate from the first inlet and the second inlet;

wherein the second set of particulate conveyors conveys the second one of the plurality of types of dry particulate into the air flow path; and wherein the first one of the plurality of types of dry particulate and/or the second one of the plurality of types of dry particulate are dispensed from the particulate handling system as dry product.

10. The particulate handling system of claim 9, wherein the drive system further comprises:

a. a first drive system in operable control of the first set of particulate conveyors;

b. a second drive system in operable control of the second set of particulate conveyors, wherein the first drive system and the second drive system operate independently.

11. The particulate handling system of claim 10, wherein the first drive system and the second drive system operate at varied speeds.

12. The particulate handling system of claim 9, wherein the particulate mixing chamber receives at least one of the first or second one of the plurality of types of dry particulates.

13. The particulate handling system of claim 9, further comprising:

one or more metering controls in operable control with the first set of particulate conveyors and the second set of particulate conveyors.

14. A dry particulate handling system for a particulate meter, the dry particulate handling system comprising:

a plurality of particulate storage areas;

a plurality of types of dry particulate, a first one of the plurality of types of dry particulate housed in a first one of the plurality of particulate storage areas;

a first set of particulate conveyors in operable communication with the first one of the plurality of particulate storage areas;

a second set of particulate conveyors in operable communication with a second one of the particulate storage areas, the second set of particulate conveyors being collinear with the first set of particulate conveyors;

a drive system in operable control of the first set of particulate conveyors and the second set of particulate conveyors;

a particulate mixing chamber having a first inlet for particulate and a second inlet for particulate where the first inlet and the second inlet are located on opposite sides of the mixing chamber, the first inlet for particulate and the second inlet for particulate being located on the particulate mixing chamber directly below an air flow inlet and directly above an air flow outlet, the first inlet in communication with a particulate conveyor from the first set of particulate conveyors and the second inlet in communication with a particulate conveyor from the second set of particulate conveyors;

wherein the first set of particulate conveyors conveys the first one of the plurality of types of dry particulate into an air flow path configured to receive air accelerated by an air flow source, the air flow path located within the particulate mixing chamber to receive the particulate from the first inlet and the second inlet;

wherein the second set of particulate conveyors conveys the second one of the plurality of types of dry particulate into the air flow path; and wherein the first one of the plurality of types of dry particulate and/or the second one of the plurality of types of dry particulate are dispensed from the particulate handling system as dry product.

15. The particulate handling system of claim 14, wherein the drive system further comprises:

a. a first drive system in operable control of the first set of particulate conveyors;

b. a second drive system in operable control of the second set of particulate conveyors, wherein the first drive system and the second drive system operate independently.

16. The particulate handling system of claim 15, wherein the first drive system and the second drive system operate at varied speeds.

17. The particulate handling system of claim 14, wherein the particulate mixing chamber receives at least one of the first or second one of the plurality of types of dry particulates.

18. The particulate handling system of claim 14, further comprising:

one or more metering controls in operable control with the first set of particulate conveyors and the second set of particulate conveyors.

19. The particulate handling system of claim 14 wherein the first set of particulate conveyors and the second set of particulate conveyors comprise augers.

* * * * *